(12) United States Patent
Yin et al.

(10) Patent No.: US 10,979,285 B2
(45) Date of Patent: Apr. 13, 2021

(54) SERVICE TRANSMISSION METHOD, DEVICE, AND SYSTEM

(71) Applicant: Huawei Technologies Co., Ltd., Guangdong (CN)

(72) Inventors: Yu Yin, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 16/370,638

(22) Filed: Mar. 29, 2019

(65) Prior Publication Data
US 2019/0230060 A1    Jul. 25, 2019

Related U.S. Application Data

(63) Continuation of application No. PCT/CN2016/101404, filed on Sep. 30, 2016.

(51) Int. Cl.
*H04L 12/24* (2006.01)
*H04L 29/12* (2006.01)
(Continued)

(52) U.S. Cl.
CPC .......... *H04L 41/0654* (2013.01); *H04L 41/06* (2013.01); *H04L 61/2007* (2013.01);
(Continued)

(58) Field of Classification Search
CPC ......... H04L 12/00; H04L 12/28; H04L 12/46; H04L 12/4633; H04L 41/00; H04L 41/06;
(Continued)

(56) References Cited

U.S. PATENT DOCUMENTS 7,155,740 B2 * 12/2006 Brustoloni ........ H04L 29/12367
                                                                 726/15
7,191,235 B1    3/2007 O'Rourke et al.
(Continued)

FOREIGN PATENT DOCUMENTS

CN    101640894 A    2/2010
CN    102014039 A    4/2011
(Continued)

OTHER PUBLICATIONS

3GPP Technical Specification (GTPv1-U) Release 13 (Year: 2015).*
S2-153863 Ericsson,"Functional split",SA WG2 Meeting #112, Nov. 16-20, 2015, Anaheim, California, USA,total 6 pages.

*Primary Examiner* — Boris D Grijalva Lobos
(74) *Attorney, Agent, or Firm* — Kilpatrick Townsend & Stockton LLP

(57) ABSTRACT

The present application relates to the field of communications technologies, and provides a service transmission method, a device, and a system, to resolve a problem that a service of user equipment is interrupted when a user plane network element is faulty. The method includes: obtaining, by a resource management node, an IP address pool; dividing the IP address pool into at least one IP address segment, and determining at least one tunnel endpoint identifier index based on the at least one IP address segment; and allocating the at least one IP address segment and the at least one tunnel endpoint identifier index to at least one user plane network element.

16 Claims, 17 Drawing Sheets

(51) Int. Cl.
*H04W 88/08* (2009.01)
*H04W 84/04* (2009.01)
*H04L 12/46* (2006.01)

(52) U.S. Cl.
CPC ......... *H04W 88/08* (2013.01); *H04L 12/4633* (2013.01); *H04W 84/042* (2013.01)

(58) Field of Classification Search
CPC . H04L 41/0654; H04L 41/0668; H04L 43/00; H04L 43/08; H04L 43/0811; H04L 61/00; H04L 61/2007; H04W 84/00; H04W 84/042; H04W 88/00; H04W 88/08
See application file for complete search history.

(56) References Cited

U.S. PATENT DOCUMENTS

| | | | | |
|---|---|---|---|---|
| 7,289,504 | B1* | 10/2007 | Hippelainen | H04L 29/12216 370/338 |
| 8,259,571 | B1* | 9/2012 | Raphel | H04L 61/2592 370/230 |
| 8,635,326 | B1* | 1/2014 | Chaganti | H04L 67/146 709/223 |
| 8,650,279 | B2 | 2/2014 | Mehta | H04W 8/082 709/223 |
| 8,855,071 | B1* | 10/2014 | Sankaran | H04W 76/11 370/329 |
| 2003/0139182 | A1* | 7/2003 | Bakkeby | H04W 8/06 455/432.1 |
| 2003/0153309 | A1* | 8/2003 | Bjelland | H04W 76/32 455/432.1 |
| 2003/0169725 | A1* | 9/2003 | Ahmavaara | H04W 36/0022 370/352 |
| 2004/0258018 | A1* | 12/2004 | Bjelland | H04W 60/00 370/331 |
| 2005/0265398 | A1* | 12/2005 | Chapman | H04L 12/1859 370/509 |
| 2007/0091862 | A1* | 4/2007 | Ioannidis | H04L 45/00 370/338 |
| 2007/0213058 | A1* | 9/2007 | Shaheen | H04W 36/12 455/436 |
| 2007/0248064 | A1* | 10/2007 | Shaheen | H04W 76/12 370/338 |
| 2009/0116513 | A1* | 5/2009 | Gray | H04W 88/16 370/475 |
| 2010/0260129 | A1* | 10/2010 | Ulupinar | H04W 28/06 370/329 |
| 2011/0110308 | A1* | 5/2011 | Liang | H04W 60/06 370/328 |
| 2012/0239966 | A1* | 9/2012 | Kompella | H04W 24/04 714/4.11 |
| 2013/0157661 | A1* | 6/2013 | Bhaskaran | H04W 60/00 455/436 |
| 2014/0369198 | A1* | 12/2014 | Rinne | H04L 45/245 370/235 |
| 2015/0109901 | A1 | 4/2015 | Tan et al. | |
| 2015/0110095 | A1 | 4/2015 | Tan et al. | |
| 2015/0138952 | A1* | 5/2015 | Tamura | H04L 45/58 370/225 |
| 2017/0208634 | A1* | 7/2017 | Bharatia | H04W 76/11 |
| 2017/0310592 | A1* | 10/2017 | Synnergren | H04L 45/38 |
| 2017/0318512 | A1* | 11/2017 | Fujinami | H04W 76/18 |
| 2018/0035343 | A1* | 2/2018 | Godin | H04W 36/22 |
| 2018/0139651 | A1* | 5/2018 | Kim | H04L 29/12 |
| 2018/0234961 | A1 | 8/2018 | Tan et al. | |
| 2019/0166634 | A1 | 5/2019 | Ni et al. | |

FOREIGN PATENT DOCUMENTS

| | | |
|---|---|---|
| CN | 103139752 A | 6/2013 |
| CN | 103945560 A | 7/2014 |
| EP | 2445261 A1 | 4/2012 |
| EP | 3461071 A1 | 3/2019 |
| WO | 2014000286 A1 | 1/2014 |
| WO | 2014000304 A1 | 1/2014 |

* cited by examiner

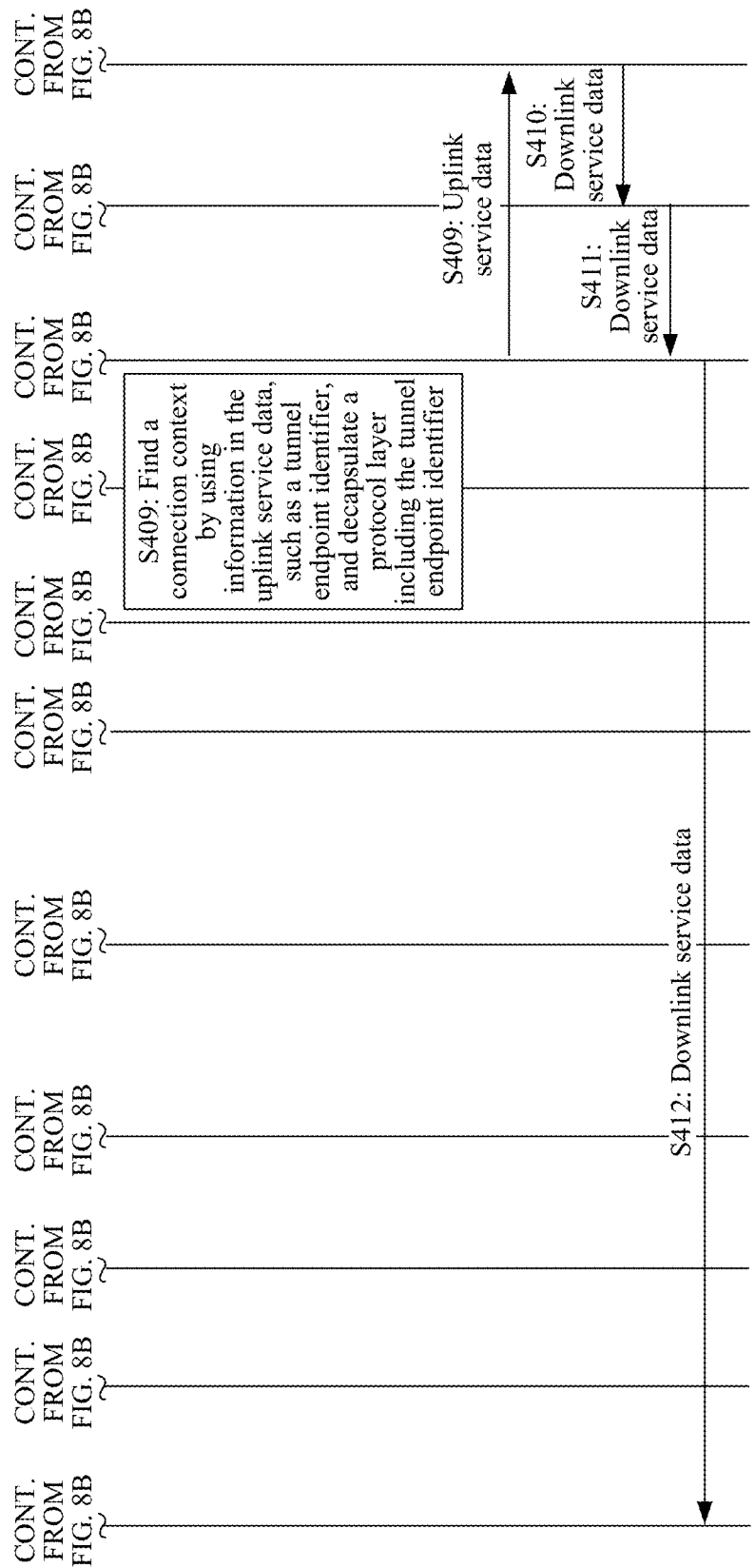

SERVICE TRANSMISSION METHOD, DEVICE, AND SYSTEM

CROSS-REFERENCE TO RELATED APPLICATIONS

This application is a continuation of International Application No. PCT/CN2016/101404 filed on Sep. 30, 2016, the disclosure of which is hereby incorporated by reference in its entirety.

TECHNICAL FIELD

The present application relates to the field of communications technologies, and in particular, to a service transmission method, a device, and a system.

BACKGROUND

In a logical architecture of a next generation mobile communications network shown in FIG. 1, user equipment (UE) accesses the mobile communications network by using a local radio access network. A control plane (CP) or Core Control Function (CCF) network element is responsible for connection management, security authentication, mobility management, location management, and the like of the UE, and a user plane (UP) network element is responsible for forwarding of user service data. In actual network deployment, the user plane network element in FIG. 1 that is responsible for forwarding of the user service data may become faulty. In this case, a method is required to ensure transmission of the user service data when the user plane network element is faulty.

Currently, when the user plane network element in the next generation mobile communications network is faulty, usually, with reference to a processing method used when a packet data network gateway (P-GW) in a fourth generation (4G) communications network is faulty, a solution shown in FIG. 2 is used to ensure normal transmission of the user service data. Specifically, the solution shown in FIG. 2 includes: (1) After detecting that a user plane network element 1 is faulty, a control plane network element learns of affected user equipments, and instructs these user equipments to re-establish a data connection. (2) After receiving a notification from the control plane network element, the user equipment initiates a connection establishment request, requesting to re-establish a data connection. (3) After receiving the request from the user equipment, the control plane network element selects a new user plane network element 2 to establish a data connection. (4) The user plane network element 2 returns a connection establishment response, and allocates an Internet Protocol (IP) address to the user equipment. (5) The control plane network element returns the connection establishment response to the user equipment. In this way, the user equipment establishes a data connection to the new user plane network element, and the new user plane network element forwards service data of the user equipment.

Currently, when a user plane network element is faulty, user equipment can establish a data connection to another user plane network element to ensure normal transmission of user service data. However, during data connection establishment between the user equipment and the user plane network element, temporarily no user plane network element is available for forwarding the user service data, and a new user equipment IP address for communicating with an application is allocated. As a result, a service of the user equipment is interrupted, and user service experience is affected.

SUMMARY

This application provides a service transmission method, a device, and a system, to resolve a problem that a service of user equipment is interrupted when a user plane network element is faulty.

To achieve the foregoing objective, the following technical solutions are used in this application.

According to a first aspect, the present application provides a service transmission method. The method is performed by a resource management node, and may include: obtaining a user equipment IP address pool; dividing the user equipment IP address pool into at least one user equipment IP address segment, and determining at least one tunnel endpoint identifier index based on the at least one user equipment IP address segment; and allocating the at least one user equipment IP address segment and the at least one tunnel endpoint identifier index to at least one user plane network element. The user equipment IP address pool is referred to as the IP address pool for short, and the user equipment IP address segment is referred to as the IP address segment for short.

In this way, a resource management node newly added in a network manages an IP address and a tunnel endpoint identifier, and maintains a correspondence among the tunnel endpoint identifier index, the user equipment IP address segment, and the user plane network element. There is no necessary binding relationship among a user equipment IP address, a tunnel endpoint identifier, and a user plane network element. The resource management node may dynamically adjust a correspondence among the user equipment IP address, the tunnel endpoint identifier, and the user plane network element based on a network status (for example, a user plane network element is faulty/overloaded), so that when the user equipment IP address and the tunnel endpoint identifier remain unchanged, user service data is forwarded by using a new user plane network element, without establishing a new data connection between user equipment and the user plane network element. This avoids a problem that a service of the user equipment is interrupted. In addition, according to the method, no configuration related to service data forwarding needs to be performed on the user plane network element, thereby simplifying configuration of the user plane network element, implementing configuration-free for the user plane network element, and supporting plug-and-play of the user plane network element.

In an implementation of the first aspect, with reference to the first aspect, the method may further include:

notifying, by the resource management node, a first forwarding node of a correspondence between the IP address segment and the user plane network element, and notifying a second forwarding node of a correspondence between the tunnel endpoint identifier index and the user plane network element.

In this way, the resource management node can directly notify the forwarding nodes of the correspondences, and the forwarding nodes send service data of user equipment to a corresponding user plane network element based on the correspondence, to implement forwarding of the service data.

In another implementation of the first aspect, with reference to the first aspect, the method may further include:

notifying, by the resource management node, a transmission control node of a correspondence among the IP address segment, the tunnel endpoint identifier index, and the user plane network element, where the correspondence is used to instruct the transmission control node to: notify a first forwarding node of a correspondence between the IP address segment and the user plane network element, and notify a second forwarding node of a correspondence between the tunnel endpoint identifier index and the user plane network element.

The correspondence among the IP address segment, the tunnel endpoint identifier index, and the user plane network element is specifically a correspondence among the IP address segment, the tunnel endpoint identifier index, and an identifier of the user plane network element, where the identifier of the user plane network element includes an IP address of the user plane network element, or an identity ID of the user plane network element.

In this way, the resource management node can first notify the transmission control node of the correspondence among the IP address segment, the tunnel endpoint identifier index, and the user plane network element, then the transmission control node notifies the forwarding node of the correspondence, and the forwarding node sends service data of user equipment to a corresponding user plane network element based on the correspondence, to implement forwarding of the service data.

In another implementation of the first aspect, with reference to the first aspect or any implementation of the first aspect, the allocating, by the resource management node, the at least one IP address segment and the at least one tunnel endpoint identifier index to at least one user plane network element may include:

allocating, by the resource management node, the at least one IP address segment and the at least one tunnel endpoint identifier index to the at least one user plane network element based on user plane network element information, where the user plane network element information includes a quantity of available user plane network elements and/or a capacity of a user plane network element in a network in which the resource management node is located.

An IP address segment and a tunnel endpoint identifier index that is determined based on the IP address segment are allocated to a same user plane network element. Different user plane network elements are allocated different IP address segments.

In this way, the IP address segment and the tunnel endpoint identifier index can be allocated based on the quantity and the capacity of user plane network elements in the network, implementing load balancing between the user plane network elements.

In addition, when a new user plane network element is added to the network, some IP address segments and tunnel endpoint identifier indexes corresponding to an existing user plane network element may be allocated to the newly added user plane network element, to alleviate load on the existing user plane network element. Specifically, the resource management node may allocate at least one IP address segment obtained through division and at least one tunnel endpoint identifier index to the newly added user plane network element.

In this way, when a new user plane network element is added, an IP address and a tunnel endpoint identifier related to user equipment can be allocated to the newly added user plane network element without interrupting a service of the user equipment. In addition, when a new user plane network element is added to the network, no configuration needs to be performed, implementing plug-and-play of the newly added user plane network element.

Further, when there is a faulty/overloaded user plane network element in the network, to ensure normal forwarding of service data that is originally carried on the user plane network element, an IP address segment and a tunnel endpoint identifier index corresponding to the user plane network element may be allocated to another available user plane network element, so that the service data is forwarded by the other available user plane network element. Specifically, in another implementation of the first aspect, with reference to the first aspect or any implementation of the first aspect, the resource management node may obtain some or all of IP address segments allocated to a first user plane network element, and use the some or all of the IP address segments allocated to the first user plane network element as the IP address pool; and the resource management node allocates the at least one IP address segment and the at least one tunnel endpoint identifier index to at least one user plane network element different from the first user plane network element.

The first user plane network element may be the faulty or overloaded user plane network element.

In this way, the resource management node can re-allocate the user equipment IP address segment and the tunnel endpoint identifier index that are allocated to the faulty or overloaded user plane network element to another user plane network element that is in normal communication, so that when a user plane network element is faulty, overloaded, or the like, a user plane network element forwarding a service data packet of the user equipment can be changed without interrupting a service of the user equipment.

According to a second aspect, the present application provides a service transmission method. The method is performed by a transmission control node, and the method may include: obtaining a correspondence among an IP address segment, a tunnel endpoint identifier index, and a user plane network element that is sent by a resource management node; notifying a first forwarding node of a correspondence between the IP address segment and the user plane network element; and notifying a second forwarding node of a correspondence between the tunnel endpoint identifier index and the user plane network element.

The correspondence among the IP address segment, the tunnel endpoint identifier index, and the user plane network element specifically includes a correspondence among the IP address segment, the tunnel endpoint identifier index, and an identifier of the user plane network element, where the identifier of the user plane network element includes an IP address of the user plane network element, or an identity ID of the user plane network element.

In this way, the resource management node can first notify the transmission control node of the correspondence among the IP address segment, the tunnel endpoint identifier index, and the user plane network element, then the transmission control node notifies the forwarding node of the correspondence, and the forwarding node sends service data of user equipment to a corresponding user plane network element based on the correspondence, to implement forwarding of the service data.

According to a third aspect, the present application provides a service transmission method. The method is performed by a first forwarding node, and the method may include: obtaining a correspondence between an IP address segment and a user plane network element; and forwarding, to the user plane network element based on the correspondence between the IP address segment and the user plane network element, downlink service data sent by a packet data network.

The first forwarding node may be a forwarding node that is located between the user plane network element and the packet data network and that is in a network in which the resource management node is located.

In this way, the first forwarding node can forward, to the corresponding user plane network element based on the correspondence obtained by the first forwarding node forwards, the downlink service data that is received from the packet data network.

Optionally, in an implementation of the third aspect, with reference to the third aspect, the first forwarding node may directly obtain a correspondence between an IP address segment and a user plane network element that is notified by a resource management node; or may obtain a correspondence between an IP address segment and a user plane network element that is notified by a transmission control node.

According to a fourth aspect, the present application provides a service transmission method. The method is performed by a second forwarding node, and the method may include: obtaining a correspondence between a tunnel endpoint identifier index and a user plane network element; and forwarding, to the user plane network element based on the correspondence between the tunnel endpoint identifier index and the user plane network element, uplink service data sent by an access network.

In this way, the second forwarding node can forward, to the corresponding user plane network element based on the correspondence obtained by the second forwarding node, the uplink service data that is received from the access network.

Optionally, in an implementation of the fourth aspect, with reference to the fourth aspect, the second forwarding node may directly obtain a correspondence between a tunnel endpoint identifier index and a user plane network element that is notified by a resource management node; or may obtain a correspondence between a tunnel endpoint identifier index and a user plane network element that is notified by a transmission control node.

According to a fifth aspect, the present application provides a resource management node. The resource management node includes:

an obtaining unit, configured to obtain an IP address pool;
a determining unit, configured to: divide the IP address pool obtained by the obtaining unit into at least one IP address segment, and determine at least one tunnel endpoint identifier index based on the at least one IP address segment; and an allocation unit, configured to: allocate, to at least one user plane network element, the at least one IP address segment and the at least one tunnel endpoint identifier index that are determined by the determining unit.

For specific implementations of the fifth aspect, refer to actions and functions of the resource management node in the service transmission method provided in the first aspect or the possible implementations of the first aspect. Details are not described herein again. Therefore, the resource management node provided in the fifth aspect can achieve beneficial effects the same as those in the first aspect.

According to a sixth aspect, the present application provides a resource management node. The resource management node includes:

a transceiver, configured to obtain an IP address pool; and
a processor, configured to: divide the IP address pool obtained by the transceiver into at least one IP address segment, and determine at least one tunnel endpoint identifier index based on the at least one IP address segment; and allocate, to at least one user plane network element, the at least one IP address segment and the at least one tunnel endpoint identifier index that are determined by the processor.

For specific implementations of the sixth aspect, refer to actions and functions of the resource management node in the service transmission method provided in the first aspect or the possible implementations of the first aspect. Details are not described herein again. Therefore, the resource management node provided in the sixth aspect can achieve beneficial effects the same as those in the first aspect.

According to a seventh aspect, the present application provides a non-volatile computer readable storage medium that stores one or more programs, where the one or more programs include an instruction, and when the instruction is executed by the resource management node in any one of the fifth aspect, the sixth aspect, or the foregoing possible implementations thereof, the resource management node executes the following events:

obtaining an IP address pool; dividing the IP address pool into at least one IP address segment, and determining at least one tunnel endpoint identifier index based on the at least one IP address segment; and allocating the at least one IP address segment and the at least one tunnel endpoint identifier index to at least one user plane network element.

For specific implementations of the seventh aspect, refer to actions and functions of the resource management node in the service transmission method provided in the first aspect or the possible implementations of the first aspect. Details are not described herein again. Therefore, the resource management node provided in the seventh aspect can achieve beneficial effects the same as those in the first aspect.

According to an eighth aspect, the present application provides a transmission control node, where the transmission control node includes: an obtaining unit, configured to: obtain a correspondence among an IP address segment, a tunnel endpoint identifier index, and a user plane network element that is sent by a resource management node; and a notification unit, configured to: notify a first forwarding node of a correspondence between the IP address segment and the user plane network element that is obtained by the obtaining unit, and notify a second forwarding node of a correspondence between the tunnel endpoint identifier index and the user plane network element that is obtained by the obtaining unit.

For specific implementations of the eighth aspect, refer to actions and functions of the transmission control node in the service transmission method provided in the second aspect or the possible implementations of the second aspect. Details are not described herein again. Therefore, the transmission control node provided in the eighth aspect can achieve beneficial effects the same as those in the second aspect.

According to a ninth aspect, the present application provides a transmission control node, where the transmission control node includes: a transceiver, configured to: obtain a correspondence among an IP address segment, a tunnel endpoint identifier index, and a user plane network element that is sent by a resource management node; and notify a first forwarding node of a correspondence between the IP address segment and the user plane network element that is obtained by the transceiver, and notify a second forwarding node of a correspondence between the tunnel endpoint identifier index and the user plane network element that is obtained by the transceiver.

For specific implementations of the ninth aspect, refer to actions and functions of the transmission control node in the service transmission method provided in the second aspect or the possible implementations of the second aspect. Details are not described herein again. Therefore, the transmission control node provided in the ninth aspect can achieve beneficial effects the same as those in the second aspect.

According to a tenth aspect, the present application provides a non-volatile computer readable storage medium that stores one or more programs, where the one or more programs include an instruction, and when the instruction is executed by the transmission control node in any one of the eighth aspect, the ninth aspect, or the foregoing possible implementations thereof, the transmission control node executes the following events:

obtaining a correspondence among an IP address segment, a tunnel endpoint identifier index, and a user plane network element that is sent by a resource management node; notifying a first forwarding node of an obtained correspondence between the IP address segment and the user plane network element; and notifying a second forwarding node of a correspondence between the tunnel endpoint identifier index and the user plane network element.

For specific implementations of the tenth aspect, refer to actions and functions of the transmission control node in the service transmission method provided in the second aspect or the possible implementations of the second aspect. Details are not described herein again. Therefore, the transmission control node provided in the tenth aspect can achieve beneficial effects the same as those in the second aspect.

According to an eleventh aspect, the present application provides a first forwarding node. The first forwarding node includes: an obtaining unit, configured to obtain a correspondence between an IP address segment and a user plane network element; and a sending unit, configured to: forward, to the user plane network element based on the correspondence between the IP address segment and the user plane network element that is obtained by the obtaining unit, downlink service data sent by a packet data network.

For specific implementations of the eleventh aspect, refer to actions and functions of the first forwarding node in the service transmission method provided in the third aspect or the possible implementations of the third aspect. Details are not described herein again. Therefore, the first forwarding node provided in the eleventh aspect can achieve beneficial effects the same as those in the third aspect.

According to a twelfth aspect, the present application provides a first forwarding node. The first forwarding node includes: a transceiver, configured to obtain a correspondence between an IP address segment and a user plane network element; and forward, to the user plane network element based on the correspondence between the IP address segment and the user plane network element that is obtained by the transceiver, downlink service data sent by a packet data network.

For specific implementations of the twelfth aspect, refer to actions and functions of the first forwarding node in the service transmission method provided in the third aspect or the possible implementations of the third aspect. Details are not described herein again. Therefore, the first forwarding node provided in the twelfth aspect can achieve beneficial effects the same as those in the third aspect.

According to a thirteenth aspect, the present application provides a non-volatile computer readable storage medium that stores one or more programs, where the one or more programs include an instruction, and when the instruction is executed by the first forwarding node in any one of the eighth aspect, the ninth aspect, or the foregoing possible implementations thereof, the first forwarding node executes the following events:

obtaining a correspondence between an IP address segment and a user plane network element; and forwarding, to the user plane network element based on the obtained correspondence between the IP address segment and the user plane network element, downlink service data sent by a packet data network.

For specific implementations of the thirteenth aspect, refer to actions and functions of the first forwarding node in the service transmission method provided in the third aspect or the possible implementations of the third aspect. Details are not described herein again. Therefore, the first forwarding node provided in the thirteenth aspect can achieve beneficial effects the same as those in the third aspect.

According to a fourteenth aspect, the present application provides a second forwarding node. The second forwarding node includes: an obtaining unit, configured to obtain a correspondence between a tunnel endpoint identifier index and a user plane network element; and a sending unit, configured to: forward, to the user plane network element based on the correspondence between the tunnel endpoint identifier index and the user plane network element that is obtained by the obtaining unit, uplink service data sent by an access network.

For specific implementations of the fourteenth aspect, refer to actions and functions of the second forwarding node in the service transmission method provided in the fourth aspect or the possible implementations of the fourth aspect. Details are not described herein again. Therefore, the second forwarding node provided in the fourteenth aspect can achieve beneficial effects the same as those in the fourth aspect.

According to a fifteenth aspect, the present application provides a second forwarding node. The second forwarding node includes: a transceiver, configured to obtain a correspondence between a tunnel endpoint identifier index and a user plane network element; and forward, to the user plane network element based on the correspondence between the tunnel endpoint identifier index and the user plane network element that is obtained by the transceiver, uplink service data sent by an access network.

For specific implementations of the fifteenth aspect, refer to actions and functions of the second forwarding node in the service transmission method provided in the fourth aspect or the possible implementations of the fourth aspect. Details are not described herein again. Therefore, the second forwarding node provided in the fifteenth aspect can achieve beneficial effects the same as those in the fourth aspect.

According to a sixteenth aspect, the present application provides a non-volatile computer readable storage medium that stores one or more programs, where the one or more programs include an instruction, and when the instruction is executed by the second forwarding node in any one of the eighth aspect, the ninth aspect, or the foregoing possible implementations thereof, the second forwarding node executes the following events:

obtaining a correspondence between a tunnel endpoint identifier index and a user plane network element; and forwarding, to the user plane network element based on the obtained correspondence between the tunnel endpoint identifier index and the user plane network element, uplink service data sent by an access network.

For specific implementations of the sixteenth aspect, refer to actions and functions of the second forwarding node in the service transmission method provided in the fourth aspect or the possible implementations of the fourth aspect. Details are not described herein again. Therefore, the second forwarding node provided in the sixteenth aspect can achieve beneficial effects the same as those in the fourth aspect.

According to a seventeenth aspect, the present application provides a service transmission system, including the resource management node according to any one of the fifth aspect, the sixth aspect, the seventh aspect, or the foregoing implementations thereof, the transmission control node according to any one of the eighth aspect, the ninth aspect, the tenth aspect, or the foregoing implementations thereof, the first forwarding node according to any one of the eleventh aspect, the twelfth aspect, the thirteenth aspect, or the foregoing implementations thereof, the second forwarding node according to any one of the fourteenth aspect, the fifteenth aspect, the sixteenth aspect, or the foregoing implementations thereof, a user plane network element, UE, and a packet data network.

The service transmission system provided in the seventeenth aspect can implement the foregoing service transmission methods, and therefore can achieve beneficial effects the same as those in the foregoing service transmission methods.

BRIEF DESCRIPTION OF THE DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and persons of ordinary skill in the art may derive other drawings from these accompanying drawings without creative efforts.

FIG. 8A, FIG. 8B, and FIG. 8C are a flowchart of yet another service transmission method according to an embodiment of the present application;

DETAILED DESCRIPTION

A principle of the present application is: A resource management node is added into an original network architecture. The resource management node divides a plurality of tunnel endpoint identifiers and a plurality of user equipment IP addresses, allocates a tunnel endpoint identifier index and a user equipment IP address segment obtained after the division to a user plane network element, and notifies a transmission control node of a correspondence among the tunnel endpoint identifier index, the user equipment IP address segment, and the user plane network element. The transmission control node notifies a forwarding node of the correspondence, so that the forwarding node forwards, to a corresponding user plane network element based on the correspondence obtained by the forwarding node, service data including the tunnel endpoint identifier or service data including the user equipment IP address, and the user plane network element forwards the service data.

The following clearly describes the technical solutions in the embodiments of the present application with reference to the accompanying drawings in the embodiments of the present application. Apparently, the described embodiments are merely some rather than all of the embodiments of the present application. All other embodiments obtained by persons of ordinary skill in the art based on the embodiments of the present application without creative efforts shall fall within the protection scope of the present application.

In the descriptions of the present application, it should be understood that systems or components indicated by the terms "first", "second", "another", and the like are systems or components that have a function that are described in the embodiments, and are merely for ease of describing the present application and simplification of description, instead of indicating or implying that the systems or components shall have such names, and therefore shall not be construed as a limitation on the present application.

Figure 3:
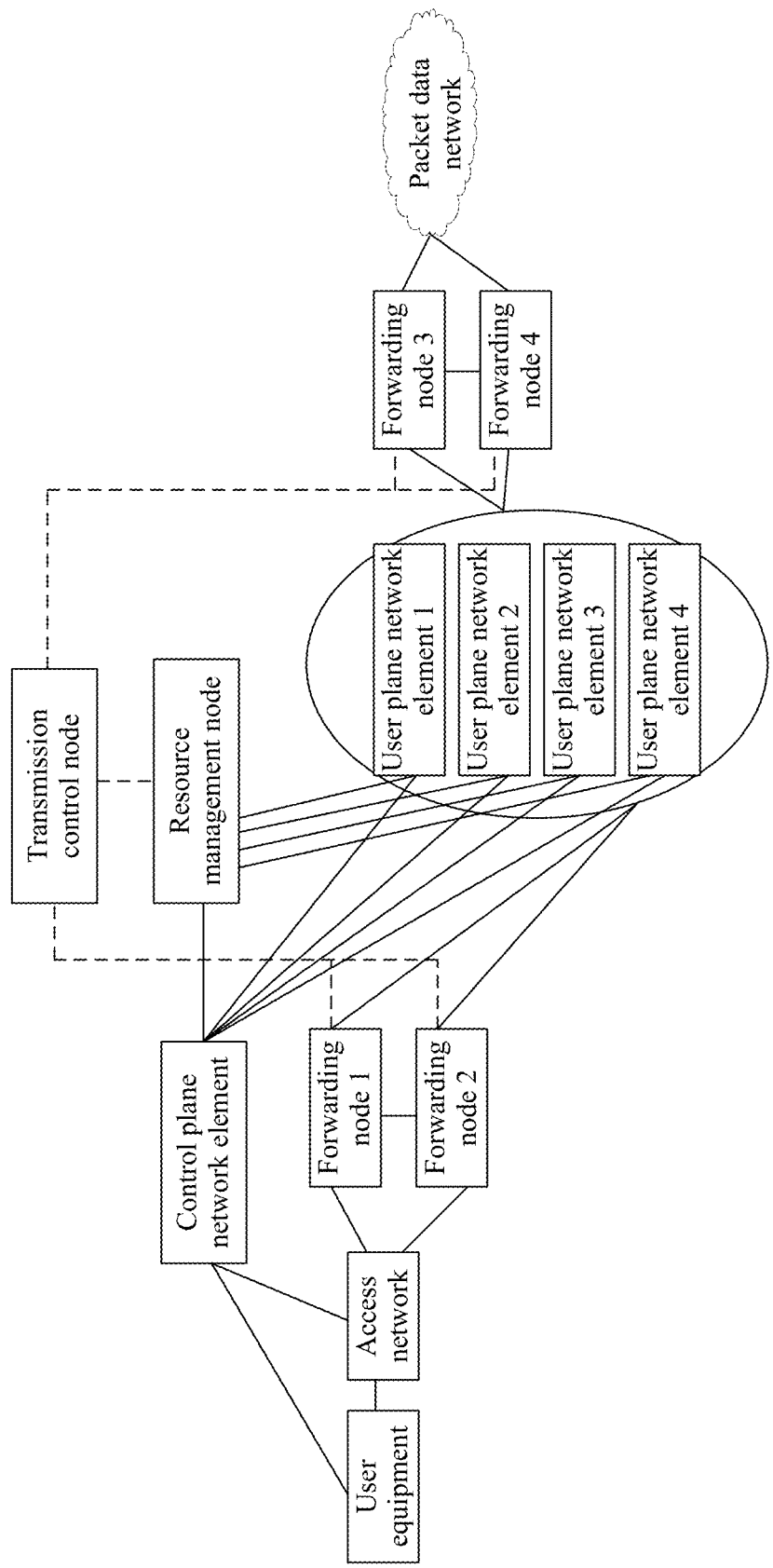
FIG. 3 is a schematic diagram of an architecture of a next generation mobile communications according to an embodiment of the present application.

The service transmission method provided in the present application may be applied to a next generation mobile communications network (NGN) shown in FIG. 3. As shown in FIG. 3, the network may include: an access network, a plurality of forwarding nodes (for example, a forwarding node 1 and a forwarding node 2) between the access network and a user plane network element, a resource management node, a transmission control node, a control plane network element, a plurality of user plane network elements, a plurality of forwarding nodes (for example, a forwarding node 3 and a forwarding node 4) between the user plane network element and a packet data network, and the packet data network. It should be noted that FIG. 3 is merely a schematic diagram, the nodes shown in FIG. 3 are merely examples, and a quantity of the nodes does not constitute any limitation on the solutions of this application. In particular, a quantity of forwarding nodes is not limited to the quantity shown in FIG. 3. In actual deployment, a plurality of forwarding nodes that are different from those shown in FIG. 3 may be deployed in the network.

Figure 1:
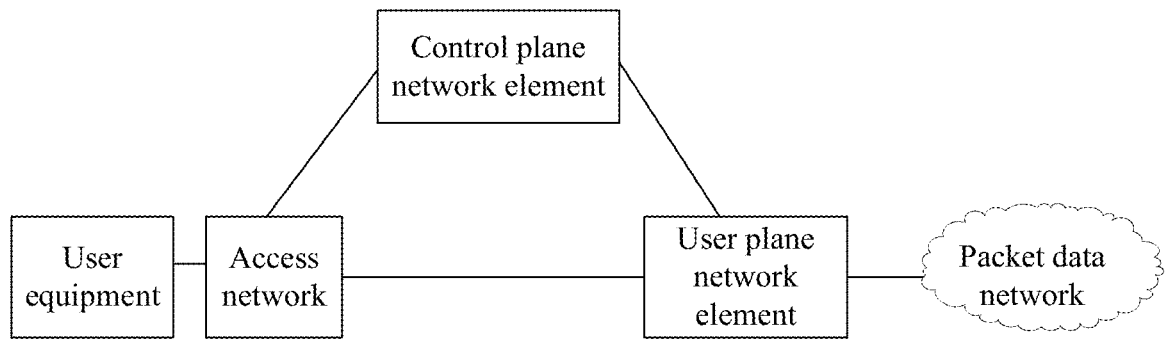
FIG. 1 is a schematic diagram of an architecture of an existing next generation mobile communications network.
Figure 2:
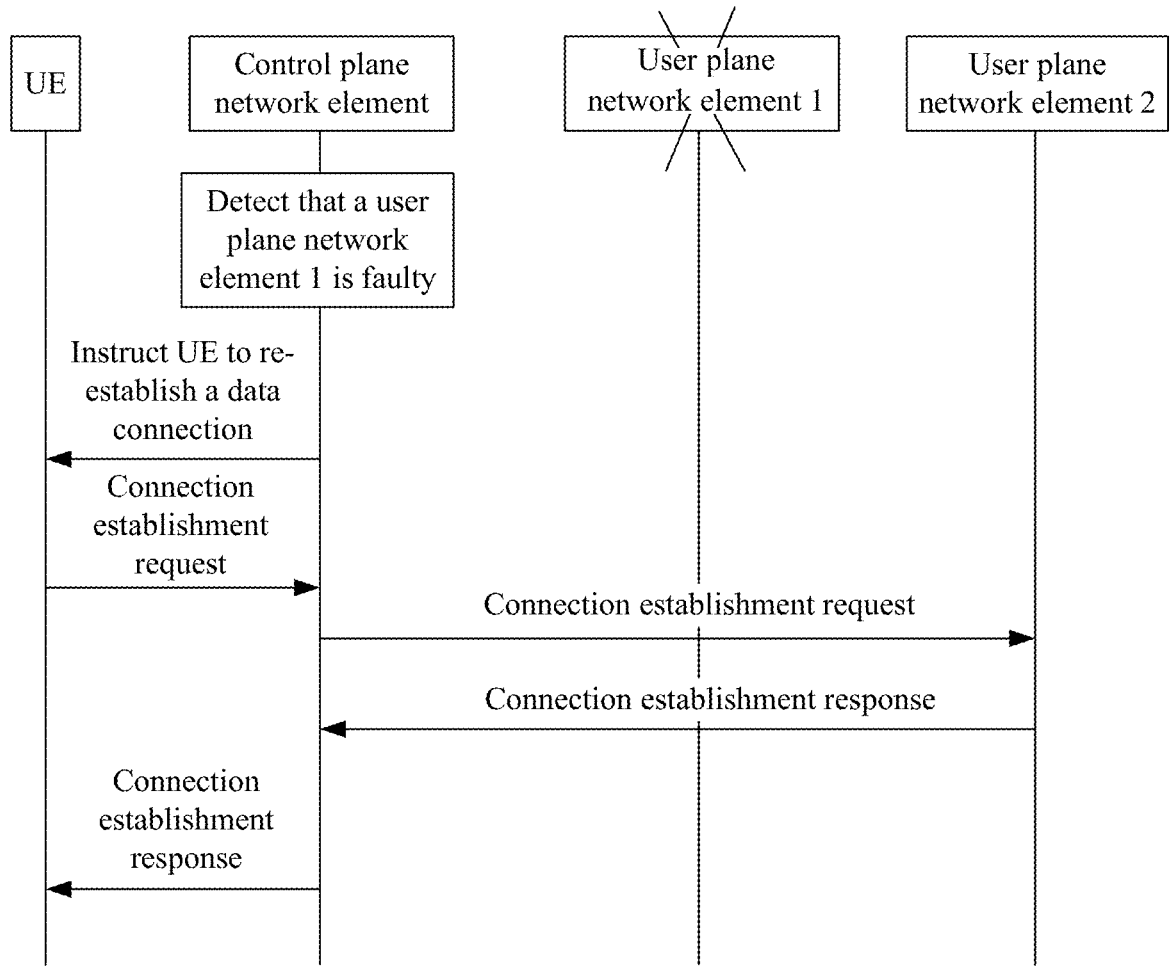
FIG. 2 is a schematic diagram of a user plane network element reset processing procedure.

The access network in FIG. 3 may be an evolved Long Term Evolution (eLTE) network, a 3rd Generation Partnership Project (3GPP) access network of a next generation network access network (NextGen RAN), or an access network such as a wireless local area network (WLAN) or a fixed access network. The forwarding nodes (for example, the forwarding node 1 and the forwarding node 2) between the access network and the user plane network element are mainly responsible for forwarding of service data between the access network and the user plane network element, and the forwarding nodes (for example, the forwarding node 3 and the forwarding node 4) between the user plane network element and the packet data network are mainly responsible for forwarding of service data between the user plane network element and the packet data network. The forwarding node may be a routing device such as a switch or a load balancing node. The transmission control node learns of a network status by monitoring the forwarding nodes, and schedules and controls traffic forwarding. The resource management node may be a management server, and is mainly responsible for dividing user equipment Internet Protocol (IP) addresses and tunnel endpoint identifiers (TED) to generate a user equipment IP address segment and a tunnel endpoint identifier index, and establishing a correspondence among the user equipment IP address segment, the tunnel endpoint identifier index, and the user plane network element. As described in FIG. 1, the user plane network element is mainly responsible for forwarding of user service data, and the control plane network element is mainly responsible for connection management, security authentication, mobility management, location management, and the like of user equipment. In the next generation mobile communications network, the control plane network element may be split into modules, and the functional modules obtained through splitting may be considered as independent network elements. For example, a CP or a CCF is split into functional modules such as a session management (SM) function and a mobility management (MM) function. In this logical architecture, functions of the control plane network element in the embodiments are implemented by the SM function SM.

It should be noted that deployment of the forwarding nodes in FIG. 3 is illustrative and is merely a feasible deployment scheme. In actual implementation, there may be different deployment manners. To be specific, each forwarding node may be deployed in a transmission network separately from other network elements of the network, for example, a switch; or each forwarding node may be deployed in a core network separately from other network elements of the network, for example, a load balancing node; or a plurality of forwarding nodes may be integrated into an existing node in the network to implement functions of the forwarding node, for example, a forwarding node between the user plane network element and the packet data network may be integrated into the user plane network element, and the user plane network element implements the functions of the forwarding node. This is not limited in this embodiment of the present application. Likewise, the resource management node may be deployed in the network separately from other network elements of the network, or the resource management node may be integrated into an existing node (for example, the control plane network element) in the network to implement functions of the resource management node.

Specifically, each node or network element in FIG. 3 may include components such as a processor, a memory, a communications unit, and at least one communications bus. The communications bus is configured to implement connection and mutual communication between these apparatuses. For ease of description, the following merely uses the resource management node as an example to describe in detail components of the resource management node with reference to FIG. 4. For components of another node or network element, refer to the resource management node. Details are not described herein.

Figure 4:
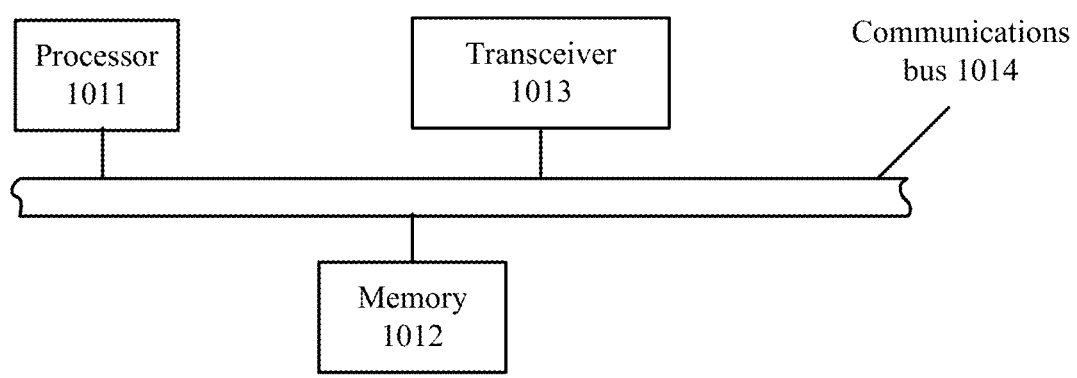
FIG. 4 is a structural diagram of a resource management node according to an embodiment of the present application.

As shown in FIG. 4, the resource management node 10 may include: a processor 1011, a memory 1012, a transceiver 1013, and at least one communications bus 1014. The communications bus 1014 is configured to implement connection and mutual communication between these apparatuses.

The processor 1011 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (generic array logic, GAL), or any combination thereof.

The memory 1012 may be a volatile memory, such as a random access memory (RAM), a non-volatile memory, such as a read-only memory (ROM), a flash memory, a hard disk, or a solid state drive (SSD), or a combination of the foregoing types of memories. The processor 1011 may implement various functions of the resource management node by running or executing program code stored in the memory 1012 and by invoking data stored in the memory 1012.

The transceiver 1013 may be configured to exchange data with an external network element. The transceiver 1013 may be an antenna.

The communications bus 1014 may be classified into an address bus, a data bus, a control bus, and the like, or may be an industry standard architecture (ISA) bus, a peripheral component interconnect (PCI) bus, an extended industry standard architecture (EISA) bus, or the like. For ease of representation, only one thick line is used to represent the bus in FIG. 4, but this does not mean that there is only one bus or only one type of bus.

For ease of description, in the following embodiment, a method for ensuring service continuity provided in the present application is shown and detailed in a form of steps. The shown steps may alternatively be performed in a form of a set of instructions executable by a computer system. In addition, although a logical order is shown in the figure, in some cases, the shown or described steps may be executed in an order different from the order herein.

Figure 5A:
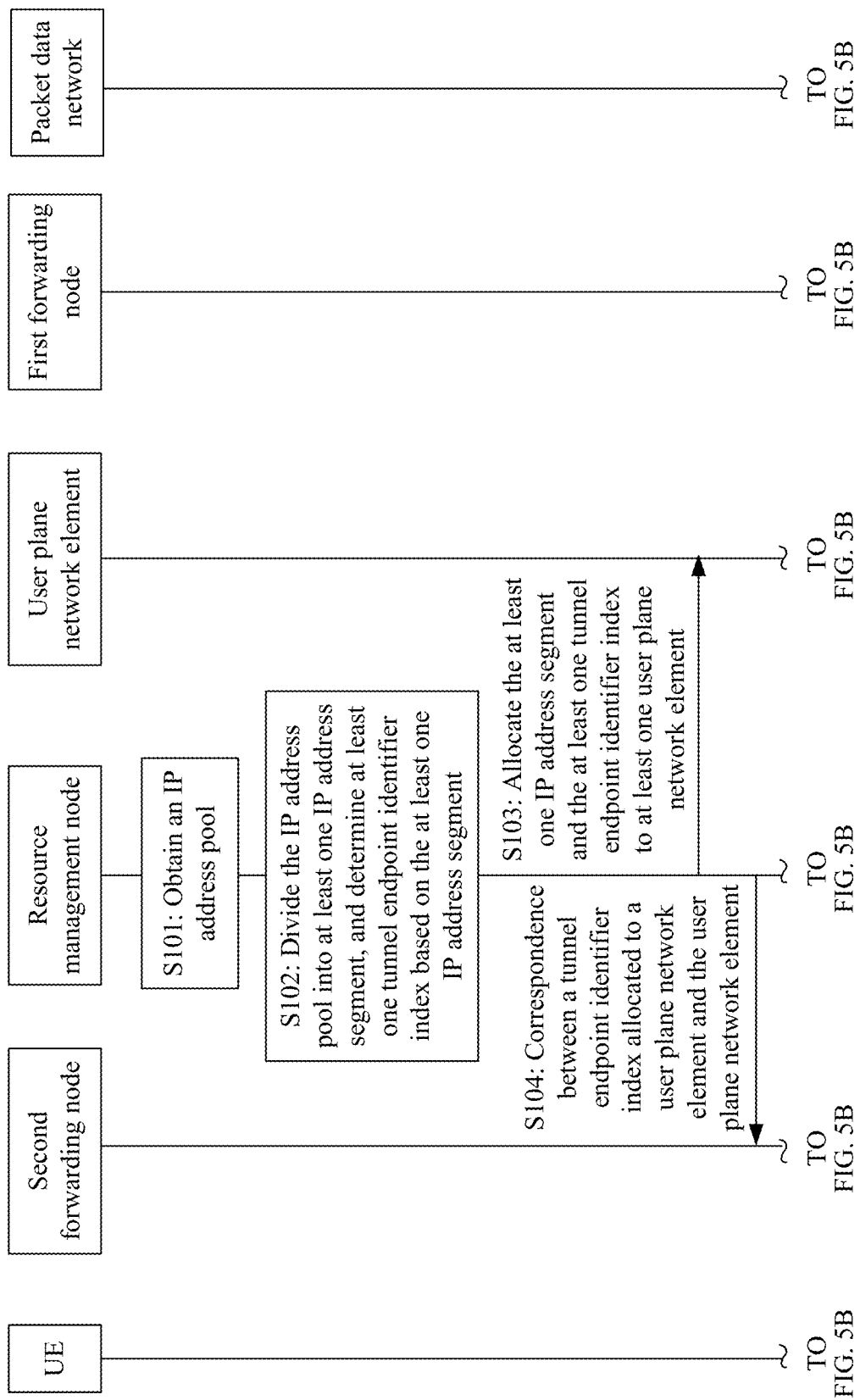
FIG. 5A and FIG. 5B are a flowchart of a service transmission method according to an embodiment of the present application.
Figure 5B:
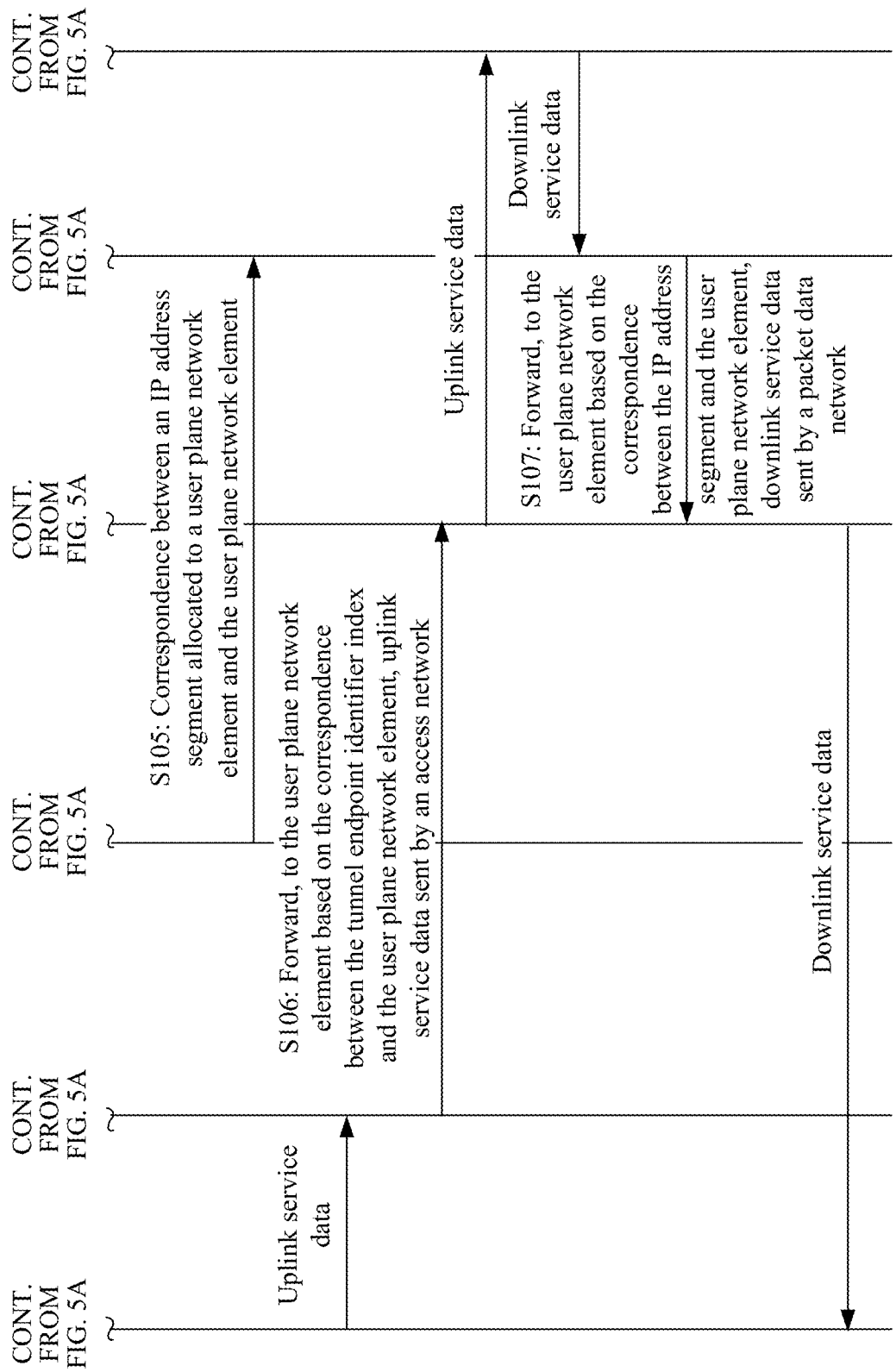

FIG. 5A and FIG. 5B are a flowchart of a service transmission method according to an embodiment of the present application. The method is performed through interaction between devices in the network shown in FIG. 3. As shown in FIG. 5A and FIG. 5B, the method may include the following steps.

Step S101: A resource management node obtains an IP address pool.

The IP address pool may include a large quantity of user equipment IP addresses. An IP address segment may also include a plurality of IP addresses, but a quantity of IP addresses included in the IP address segment may be far less than a quantity of IP addresses included in the IP address pool. An IP address may be an IP address used by UE to communicate with a packet data network.

Optionally, in a network initialization process, the resource management node may obtain the IP address pool from an operation and maintenance network element (O&M).

Step S102: The resource management node divides the IP address pool into at least one IP address segment, and determines at least one tunnel endpoint identifier index based on the at least one IP address segment.

Optionally, the resource management node may divide a plurality of user equipment IP addresses in the user equipment IP address pool into a plurality of user equipment IP address segments according to a requirement. For example, a quantity of IP addresses that can be included in an IP address segment may be preset, and the plurality of user equipment IP addresses in the user equipment IP address pool may be divided into the plurality of user equipment IP address segments based on the preset quantity. The preset quantity may be set according to a requirement, and this is not limited in this embodiment of the present application.

For one example, the preset quantity is 50,000, that is, every 50,000 user equipment IP addresses forms one user equipment IP address segment, and the user equipment IP address pool totally includes 50,000,000 user equipment IP addresses. Then the user equipment IP addresses in the user equipment IP address pool are divided into 1000 user equipment IP address segments, and each user equipment IP address segment includes 50,000 user equipment IP addresses.

The IP address segment and the tunnel endpoint identifier index in step S102 are in one-to-one correspondence. Optionally, in this embodiment of the present application, each IP address segment may be allocated one index. The index is used to identify the IP address segment. In addition, the index is placed in several bits of a tunnel endpoint identifier to generate a tunnel endpoint identifier index, so that the tunnel endpoint identifier index is determined based on the IP address segment, and service data from any IP address included in the IP address segment needs to be forwarded by using a tunnel identified by the tunnel endpoint identifier included in the tunnel endpoint identifier index. It should be noted that apart from the foregoing index, other association information may be further allocated to the IP address segment, and the association information is used to determine the tunnel endpoint identifier index corresponding to the IP address segment. This is not limited in the present application. In addition, a bit position of a tunnel endpoint identifier on which the index is placed is not limited in this embodiment of the present application.

For example, if an IP address segment 10.184.228.0 to 10.184.228.255 is allocated to a user plane network element 1, an index allocated to the IP address segment is a binary number 0001, and it is specified that a first bit to a fourth bit of 16 bits in a tunnel endpoint identifier are bits for placing information associated with the IP address segment, a tunnel endpoint identifier index that is allocated to the user plane network element 1 and that is corresponding to the IP address segment is 0001xxxxxxxxxxxx. It should be noted that an algorithm used by the resource management node to allocate an index or other association information to the IP address segment is not limited in the present application. However, it is required that each IP address segment is corresponding to one unique index or unique association information, and indexes or association information corresponding to different IP address segments are different.

A tunnel endpoint identifier is used to identify one tunnel. A tunnel is a channel between an access network and a user plane network element, and is used to forward service data between the access network and the user plane network element. In the present application, the tunnel endpoint identifier may be allocated to any user plane network element, and the tunnel endpoint identifier is used to identify a tunnel between the access network and the user plane network element. For example, if a tunnel endpoint identifier A is allocated to the user plane network element 1, it indicates that the tunnel endpoint identifier A identifies a tunnel between the access network and the user plane network element 1; if the tunnel endpoint identifier A is allocated to a user plane network element 2, it indicates that the tunnel endpoint identifier A identifies a tunnel between the access network and the user plane network element 2.

Step S103: The resource management node allocates the at least one IP address segment and the at least one tunnel endpoint identifier index to at least one user plane network element.

The IP address segment and the tunnel endpoint identifier index that is determined based on the IP address segment are allocated to a same user plane network element. Each user plane network element may be allocated one or more IP address segments, and IP address segments allocated to different user plane network elements are different.

If the resource management node allocates a tunnel endpoint identifier index to a user plane network element, it indicates that service data passing through a tunnel identified by a tunnel endpoint identifier included in the tunnel endpoint identifier index needs to be forwarded to a packet data network by the user plane network element. If the resource management node allocates an IP address segment to a user plane network element, it indicates that service data sent by a packet data network to any IP address included in the IP address segment needs to be forwarded to UE by the user plane network element.

Optionally, in the network shown in FIG. 3, the resource management node may allocate the at least one user equipment IP address segment and the at least one tunnel endpoint identifier index to each user plane network element in the network based on user plane network element information.

The user plane network element information may include: a quantity of user plane network elements, or a capacity of a user plane network element, or a quantity of user plane network elements and a capacity of a user plane network element.

Optionally, the resource management node may allocate the at least one user equipment IP address segment evenly to each user plane network element in the network based on user plane network element information, or may allocate the at least one user equipment IP address segment to each user plane network element in the network based on capacities of different user plane network elements.

For example, the resource management node may allocate, based on a quantity of user plane network elements, 1000 user equipment IP address segments evenly to the user plane network elements. For example, if there are 10 user plane network elements, each user plane network element is allocated 100 user equipment IP address segments. For another example, the resource management node may further allocate, based on a capacity of each user plane network element, 1000 user equipment IP address segments to the user plane network elements, where a user plane network element with a relatively large capacity is allocated more user equipment IP address segments, and a user plane network element with a relatively small capacity is allocated fewer user equipment IP address segments. For example, there are totally 30 user plane network elements, where capacities of 10 user plane network elements are the same, capacities of the other 20 user plane network elements are the same, and the capacity of the former is twice that of the latter. In this case, each of the 10 user plane network elements is allocated 50 user equipment IP address segments, and each of the other 20 user plane network elements is allocated 25 user equipment IP address segments.

In addition, in another feasible solution of the present application, the user equipment IP addresses in the user equipment IP address pool may be divided into a plurality of user equipment IP address segments based on the user plane network element information, tunnel endpoint identifier indexes are determined based on the IP address segments, and the IP address segments and the corresponding tunnel endpoint identifier indexes are allocated to the user plane network elements. For example, the resource management node may divide, based on the quantity of the user plane network elements, the IP addresses in the user equipment IP address pool evenly into groups with a quantity corresponding to the quantity of the user plane network elements; or the resource management node may divide, based on capacities of different user plane network elements, the IP addresses in the IP address pool into groups with a quantity corresponding to the quantity of the user plane network elements, where a user plane network element with a large capacity is allocated more user equipment IP addresses.

Step S104: The resource management node notifies a first forwarding node of a correspondence between the IP address segment allocated to the user plane network element and the user plane network element, and the first forwarding node receives the correspondence between the IP address segment of the user plane network element and the user plane network element that is notified by the resource management node.

The first forwarding node may be any forwarding node that is located between the user plane network element and the packet data network and that is in a network in which the resource management node is located, for example, the forwarding node 3 and the forwarding node 4 shown in FIG. 3.

Step S105: The resource management node notifies a second forwarding node of a correspondence between the tunnel endpoint identifier index allocated to the user plane network element and the user plane network element, and the second forwarding node receives the correspondence between the tunnel endpoint identifier index of the user plane network element and the user plane network element that is notified by the resource management node.

The second forwarding node may be any forwarding node that is located between the access network and the user plane network element and that is in a network in which the resource management node is located, for example, the forwarding node 1 or the forwarding node 2 shown in FIG. 3.

It should be noted that an order of step S104 and step S105 may change. They may be performed at the same time, or may be performed in an order different from that shown in FIG. 5A and FIG. 5B.

Optionally, after allocating the at least one IP address segment and the at least one tunnel endpoint identifier index to the at least one user plane network element, the resource management node may notify a transmission control node of a correspondence among the IP address segment, the tunnel endpoint identifier index, and the user plane network element, and the transmission control node notifies the first forwarding node of the correspondence between the IP address segment allocated to the user plane network element and the user plane network element, and notifies the second forwarding node of the correspondence between the tunnel endpoint identifier index allocated to the user plane network element and the user plane network element.

For the correspondence among the IP address segment, the tunnel endpoint identifier index, and the user plane network element that is notified to the transmission control node, the correspondence between the IP address segment and the user plane network element that is notified to the first forwarding node, and the correspondence between the tunnel endpoint identifier index and the user plane network element that is notified to the second forwarding node, a relationship with the user plane network element is a relationship with a user plane network element identifier, where the user plane network element identifier includes an IP address of the user plane network element, or an identity ID of the user plane network element.

Step 106: The second forwarding node forwards, to the user plane network element based on the correspondence between the tunnel endpoint identifier index and the user plane network element, uplink service data sent by an access network.

Step 107: The first forwarding node forwards, to the user plane network element based on the correspondence between the IP address segment and the user plane network element, downlink service data sent by a packet data network.

In this embodiment of the present application, service data sent from UE to the packet data network is referred to as uplink service data, and service data sent from the packet data network to the UE is referred to as downlink service data.

Compared with the prior art, in the technical solution shown in FIG. 5A and FIG. 5B, no configuration related to service data forwarding needs to be performed on the user plane network element, and there is no necessary binding relationship between a user equipment IP address and a user plane network element. Instead, the resource management node manages the user equipment IP address and the tunnel endpoint identifier, maintains the correspondence among the tunnel endpoint identifier index, the user equipment IP address segment, and the user plane network element, and notifies the forwarding node of the correspondence by using the transmission control node. The forwarding node sends service data of the user equipment to a corresponding user plane network element based on the correspondence, to implement forwarding of the service data. The resource management node may dynamically adjust the correspondence based on a network status, so that user service data is forwarded by a new user plane network element when the user equipment IP address and the tunnel endpoint identifier remain unchanged. In this way, when a user plane network element is faulty, overloaded, or the like, a new data connection does not need to be established between the user equipment and another user plane network element, thereby avoiding service interruption of the user equipment. In addition, the method can simplify configuration of the user plane network element, and implement configuration-free for the user plane network element, allowing the user plane network element to be plug-and-play.

It should be noted that the technical solution shown in FIG. 5A and FIG. 5B may be applied to any scenario of network initialization, user plane network element reset/overload, or user plane network element addition, to implement configuration-free for the user plane network element, and ensure service continuity in the reset/overload/addition scenario.

To make the solutions and objectives of the present application more clearly, the following describes in detail the solutions in the present application with reference to FIG. 6A, FIG. 6B, and FIG. 6C to FIG. 8A, FIG. 8B, and FIG. 8C in the network structure shown in FIG. 3.

Figure 6A:
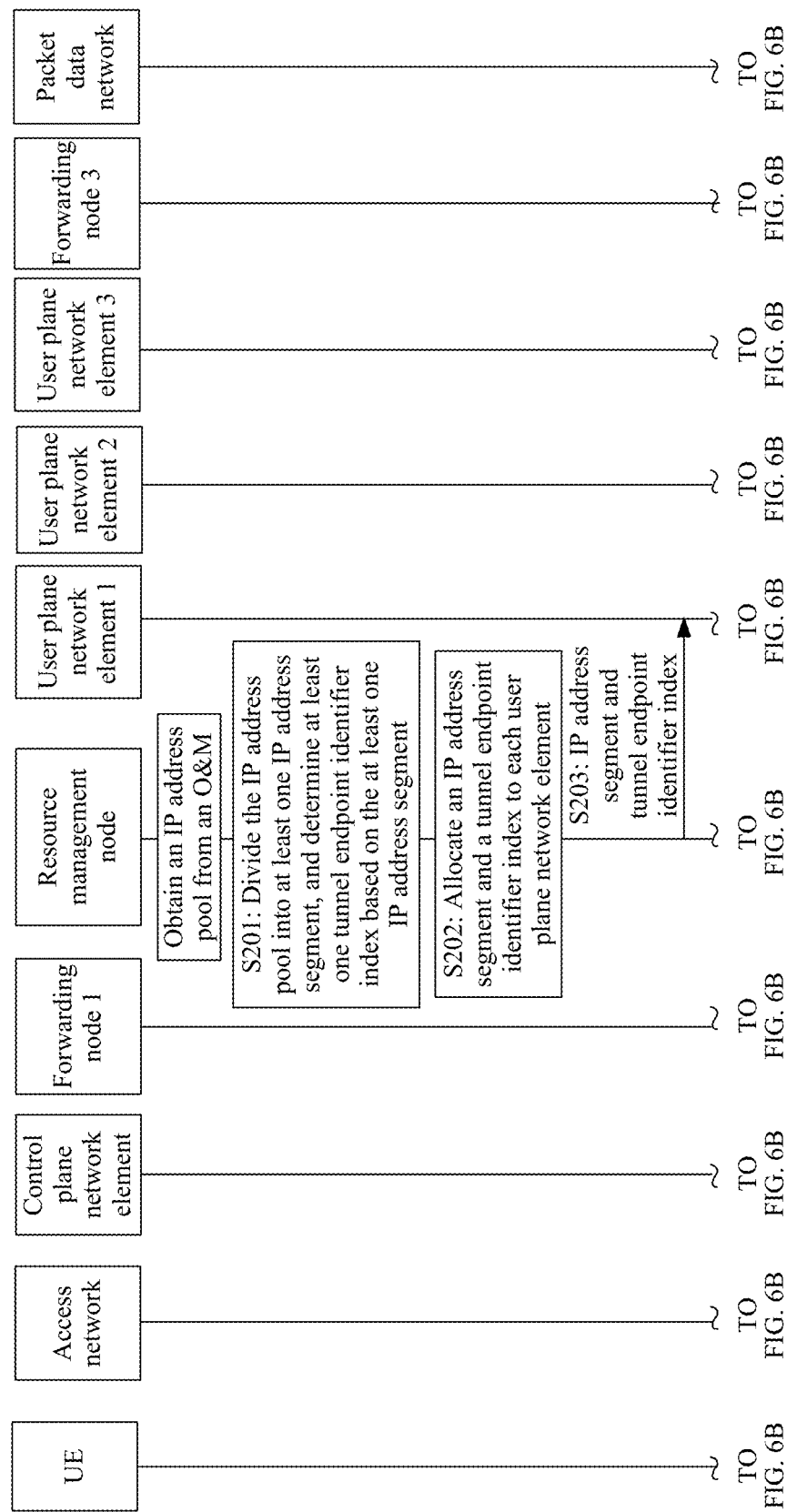
FIG. 6A, FIG. 6B, and FIG. 6C are a flowchart of another service transmission method according to an embodiment of the present application.
Figure 6B:
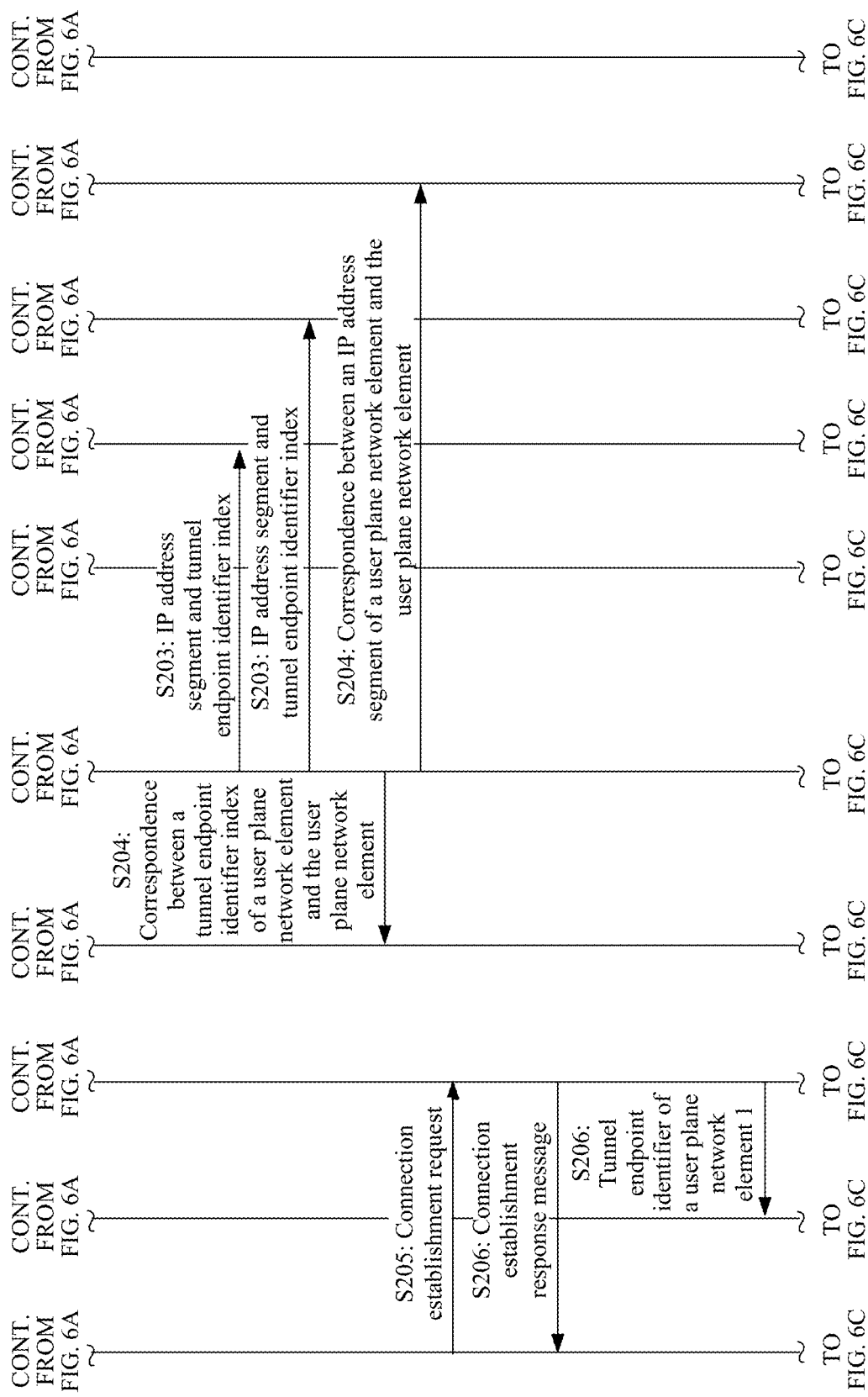
Figure 6C:
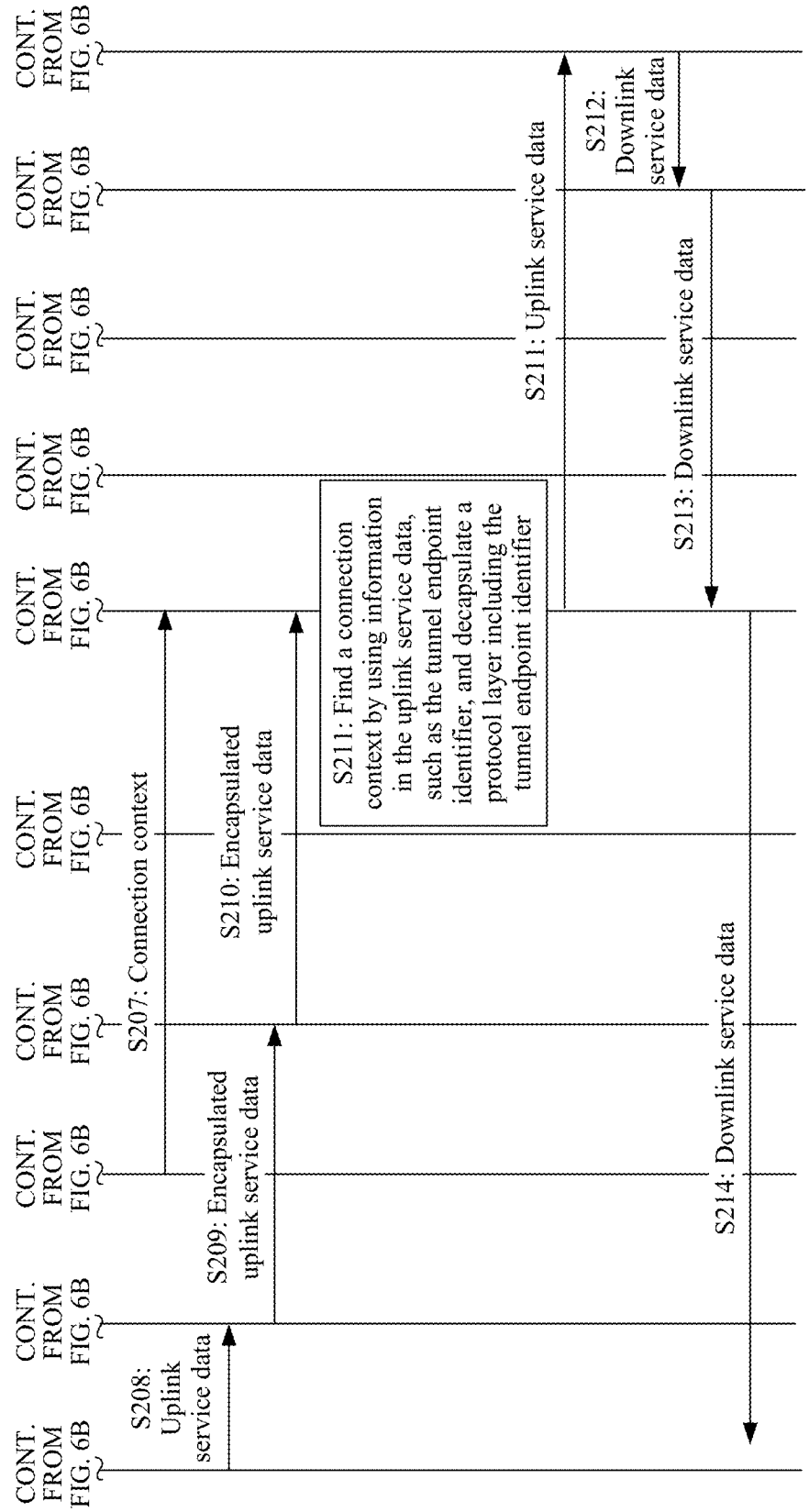

FIG. 6A, FIG. 6B, and FIG. 6C are a flowchart of a service transmission method according to an embodiment of the present application. The method is performed through interaction between the devices in the network shown in FIG. 3, and is used to allocate, in a network initialization process, a corresponding IP address segment and a tunnel endpoint identifier index to user plane network elements in the network shown in FIG. 3, and notify a corresponding forwarding node of a correspondence among a user plane network element, an allocated IP address segment, and an allocated tunnel endpoint identifier index. The forwarding node forwards, based on the received correspondence, received uplink/downlink service data to a corresponding user plane node, and the user plane network element performs service transmission. As shown in FIG. 6A, FIG. 6B, and FIG. 6C, the method may include the following steps.

A resource management node obtains an IP address pool from an O&M.

S201: The resource management node divides the IP address pool into at least one IP address segment, and determines at least one tunnel endpoint identifier index based on the at least one IP address segment.

Step S201 is the same as step S102, and details are not described herein again.

S202: The resource management node allocates an IP address segment and a tunnel endpoint identifier index to each user plane network element shown in FIG. 3.

An allocation process in step S202 is the same as that in step S103, and details are not described herein again.

S203: The resource management node notifies each user plane network element of the user equipment IP address segment and tunnel endpoint identifier index that are allocated to the user plane network element.

Optionally, the resource management node may directly notify each user plane network element of the IP address segment and the tunnel endpoint identifier index that are allocated to the user plane network element; or may notify, by using a control plane network element, each user plane network element of the IP address segment and the tunnel endpoint identifier index that are allocated to the user plane network element.

It should be noted that in this embodiment of the present application, step S203 may be performed or may not be performed. In other words, the user plane network element may know or may not know a user equipment IP address segment and a tunnel endpoint identifier index that are allocated to the user plane network element. This is not limited in the present application.

S204: The resource management node notifies a forwarding node 3 of a correspondence between the user plane network element and the IP address segment, and notifies a forwarding node 1 of a correspondence between the user plane network element and the tunnel endpoint identifier index.

It can be understood that the resource management node may alternatively notify a forwarding node 4 of the correspondence between the user plane network element and the IP address segment, and notify a forwarding node 2 of the correspondence between the user plane network element and the tunnel endpoint identifier index; or notifies both the forwarding nodes 3 and 4 of the correspondence between the user plane network element and the IP address segment, and notifies both the forwarding nodes 1 and 2 of the correspondence between the user plane network element and the tunnel endpoint identifier index. This is not limited in this embodiment of the present application. In the present application, the description is provided by using only an example of notifying the forwarding node 3 of the correspondence between the user plane network element and the IP address segment, and notifying the forwarding node 1 of the correspondence between the user plane network element and the tunnel endpoint identifier index.

Optionally, the resource management node may directly notify the forwarding node 3 of the correspondence between the user plane network element and the IP address segment, and notify the forwarding node 1 of the correspondence between the user plane network element and the tunnel endpoint identifier index.

Alternatively, the resource management node may notify a transmission control node of a correspondence among the user plane network element, the user equipment IP address segment, and the tunnel endpoint identifier index. The correspondence is a correspondence among an identifier of each user plane network element, a user equipment IP address segment allocated to the user plane network element, and a tunnel endpoint identifier index allocated to the user plane network element. The identifier of the user plane network element may be information that can uniquely identify the user plane network element, such as an IP address of the user plane network element, or an ID of the user plane network element.

After receiving the correspondence among the user plane network element, the user equipment IP address segment, and the tunnel endpoint identifier index that is sent by the resource management node, the transmission control node notifies the forwarding node 3 of the correspondence between the user plane network element and the IP address segment, and notifies the forwarding node 1 of the correspondence between the user plane network element and the tunnel endpoint identifier index.

S205: UE sends a connection establishment request to a control plane network element, where the connection establishment request is used to request to establish a connection to a packet data network.

Optionally, the UE may send the connection establishment request to the control plane network element by using an access network.

S206: After receiving the connection establishment request, if the control plane network element determines to use a user plane network element 1 to forward service data between the UE and the packet data network, the control plane network element allocates a tunnel endpoint identifier of the user plane network element 1 to an access network, and returns a connection establishment response message to the UE, where the connection establishment response message includes an IP address that is allocated to the UE by the control plane network element.

Up to now, a connection channel is established between the UE and the packet data network through the user plane network element 1. After completing the connection establishment, the control plane network element performs step S207.

The tunnel endpoint identifier of the user plane network element 1 is included in a tunnel endpoint identifier included in the tunnel endpoint identifier index allocated to the user plane network element 1 by the resource management node.

Optionally, a tunnel endpoint identifier may be randomly selected from the tunnel endpoint identifier index allocated to the user plane network element 1 by the resource management node, and the tunnel endpoint identifier is used as a tunnel endpoint identifier of the user plane network element 1 to which the UE requests to establish a connection. The tunnel endpoint identifier of the user plane network element 1 may be used to identify a unique tunnel of the user plane network element 1.

For example, if UE1 requests to establish a connection to the packet data network, the control plane network element selects the user plane network element 1 to forward service data of UE 1, and the tunnel endpoint identifier index allocated to the user plane network element 1 by the resource management node includes 50 tunnel endpoint identifiers, any tunnel endpoint identifier may be selected from the 50 tunnel endpoint identifiers, and the selected tunnel endpoint identifier is used as the tunnel endpoint identifier of the user plane network element 1.

The IP address of the UE is included in the IP address segment allocated to the user plane network element 1 by the resource management node. Optionally, the control plane network element may randomly select one IP address from the IP address segment allocated to the user plane network element 1 by the resource management node, as the IP address of the UE.

It should be noted that each user plane network element may be allocated a plurality of user equipment IP address segments, and a plurality of tunnel endpoint identifier indexes determined based on the plurality of user equipment IP address segments. A user equipment IP address segment and a tunnel endpoint identifier index determined based on the user equipment IP address segment are in a pairing relationship. In this step, when the tunnel endpoint identifier of the user plane network element 1 and the IP address of the UE are allocated, the tunnel endpoint identifier index including the tunnel endpoint identifier and the user equipment IP address segment including the IP address of the UE are in a pairing relationship.

It should be noted that in this step, if the control plane network element and the resource management node are one integrated functional network element, the control plane network element may directly allocate the tunnel endpoint identifier of the user plane network element 1 to the access network, and allocate the IP address to the UE. Otherwise, if the control plane network element and the resource management node are separate functional network elements, functions of allocating the tunnel endpoint identifier of the user plane network element 1 to the access network and allocating the IP address to the UE may be performed by the resource management node. For example, the control plane network element may request the resource management node for the tunnel endpoint identifier of the user plane network element 1 and the IP address of the UE, and the resource management node allocates the tunnel endpoint identifier of the user plane network element 1 to the access network, and allocates the IP address to the UE. An allocation method used by the resource management node is the same as an allocation method used by the control plane network element.

S207: The control plane network element notifies the user plane network element 1 of an established connection context, where the connection context includes the tunnel endpoint identifier of the user plane network element 1 allocated to the access network, and the IP address allocated to the UE.

S208: The UE sends uplink service data to the access network.

S209: After receiving the uplink service data, the access network encapsulates the tunnel endpoint identifier of the user plane network element 1 into the uplink service data, and sends the encapsulated uplink service data to the forwarding node 1.

S210: After receiving the uplink service data, the forwarding node 1 sends the uplink service data to the user plane network element 1 based on the tunnel endpoint identifier in the uplink service data, and the correspondence between the user plane network element and the tunnel endpoint identifier index that is obtained in step 204.

Optionally, the forwarding node 1 may query the correspondence between the user plane network element and the tunnel endpoint identifier index, to find a user plane network element corresponding to the tunnel endpoint identifier index to which the tunnel endpoint identifier in the uplink service data belongs, that is, the user plane network element 1, and then send the uplink service data to the user plane network element 1.

S211: After receiving the uplink service data, the user plane network element 1 finds the connection context by using information in the uplink service data, such as the tunnel endpoint identifier, decapsulates a protocol layer including the tunnel endpoint identifier, and forwards the uplink service data to the packet data network.

Otherwise, if after receiving the uplink service data, the user plane network element 1 cannot find the connection context by using information in the uplink service data, such as the tunnel endpoint identifier, the user plane network element 1 does not forward the uplink service data to the packet data network.

Correspondingly, in an inverse process of sending the uplink service data, the UE may also receive downlink service data sent by the packet data network. Details are shown in FIG. 6A, FIG. 6B, and FIG. 6C.

S212: The packet data network sends downlink service data to the forwarding node 3, where the downlink service data includes the IP address of the UE.

S213: After receiving the downlink service data, the forwarding node 3 sends the downlink service data to the user plane network element 1 based on the IP address of the UE in the downlink service data, and the correspondence between the user plane network element and the IP address segment that is obtained in step 204.

Optionally, the forwarding node 3 may query the correspondence between the user plane network element and the IP address segment, to find a user plane network element corresponding to the IP address segment to which the IP address of the UE in the downlink service data belongs, that is, the user plane network element 1, and then sends the downlink service data to the user plane network element 1.

S214: After receiving the downlink service data, the user plane network element 1 finds a connection context by using information in the downlink service data, such as the IP address of the UE, and forwards the downlink service data to the UE based on information in the connection context.

Otherwise, if after receiving the downlink service data, the user plane network element 1 cannot find a connection context by using information in the downlink service data, such as the IP address of the UE, the user plane network element 1 does not forward the downlink service data to the access network.

In this way, according to the solution shown in FIG. 6A, FIG. 6B, and FIG. 6C, the service data of the UE can be forwarded by the user plane network element 1.

Figure 7A:
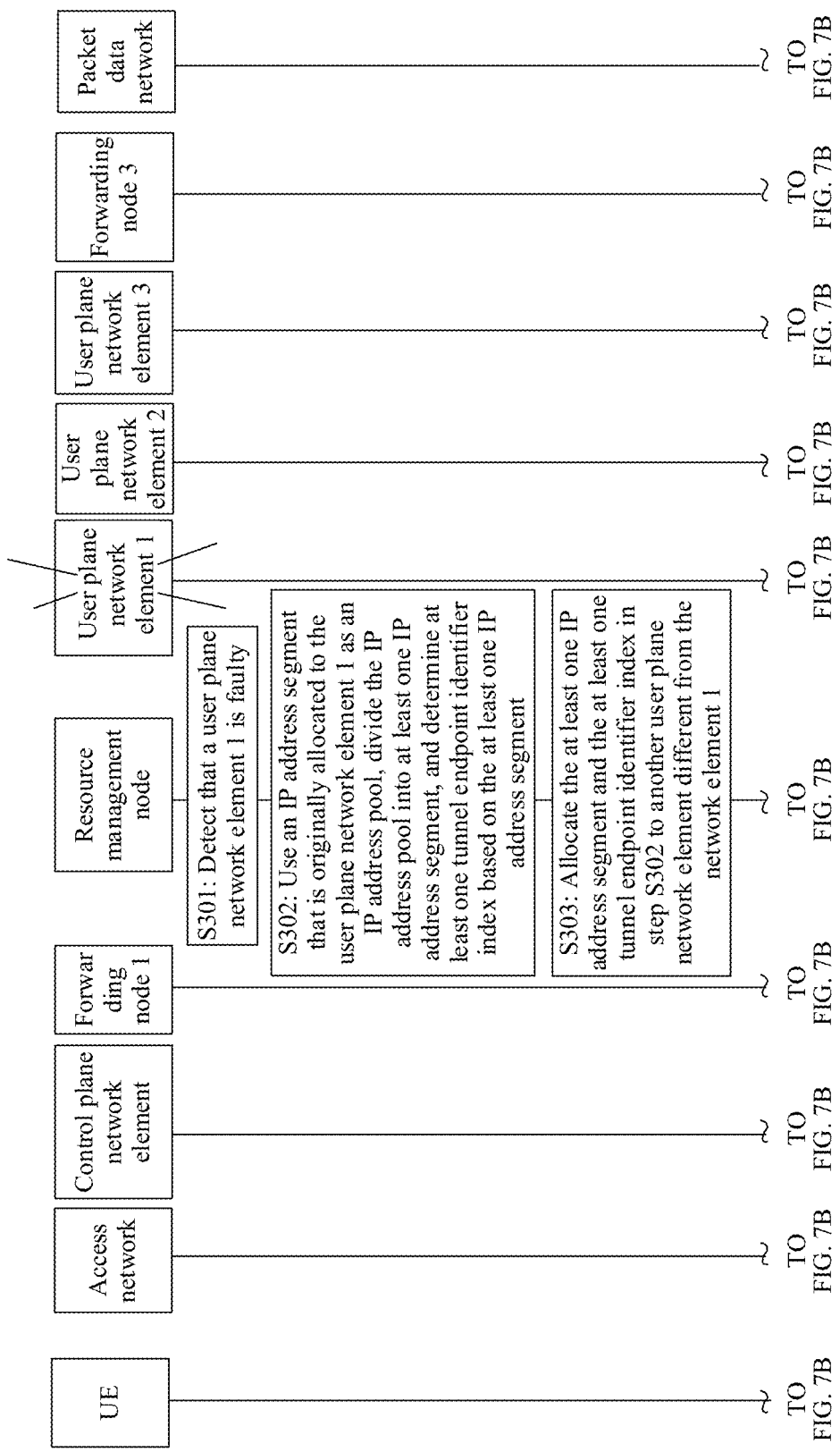
FIG. 7A, FIG. 7B, and FIG. 7C are a flowchart of still another service transmission method according to an embodiment of the present application.
Figure 7B:
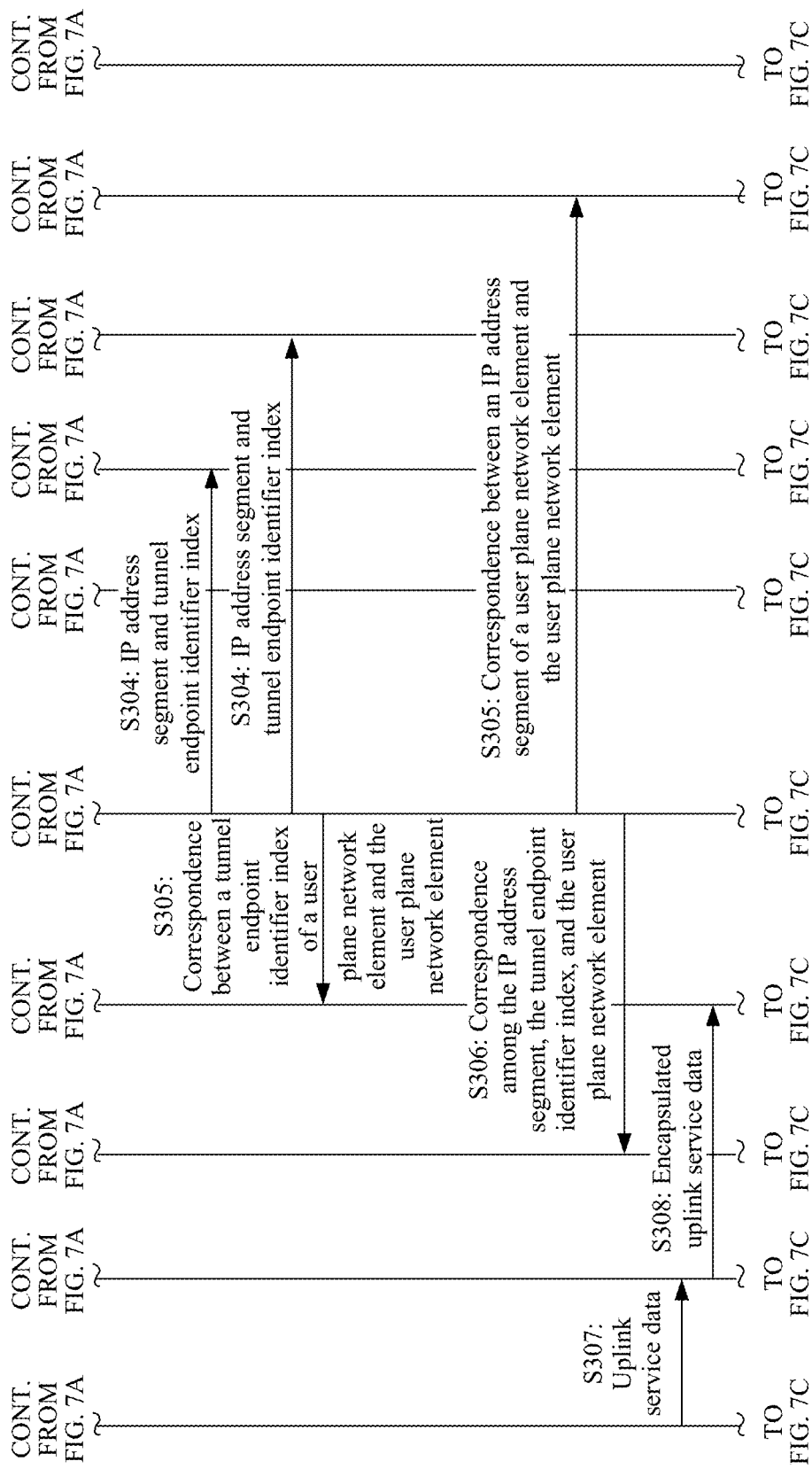
Figure 7C:
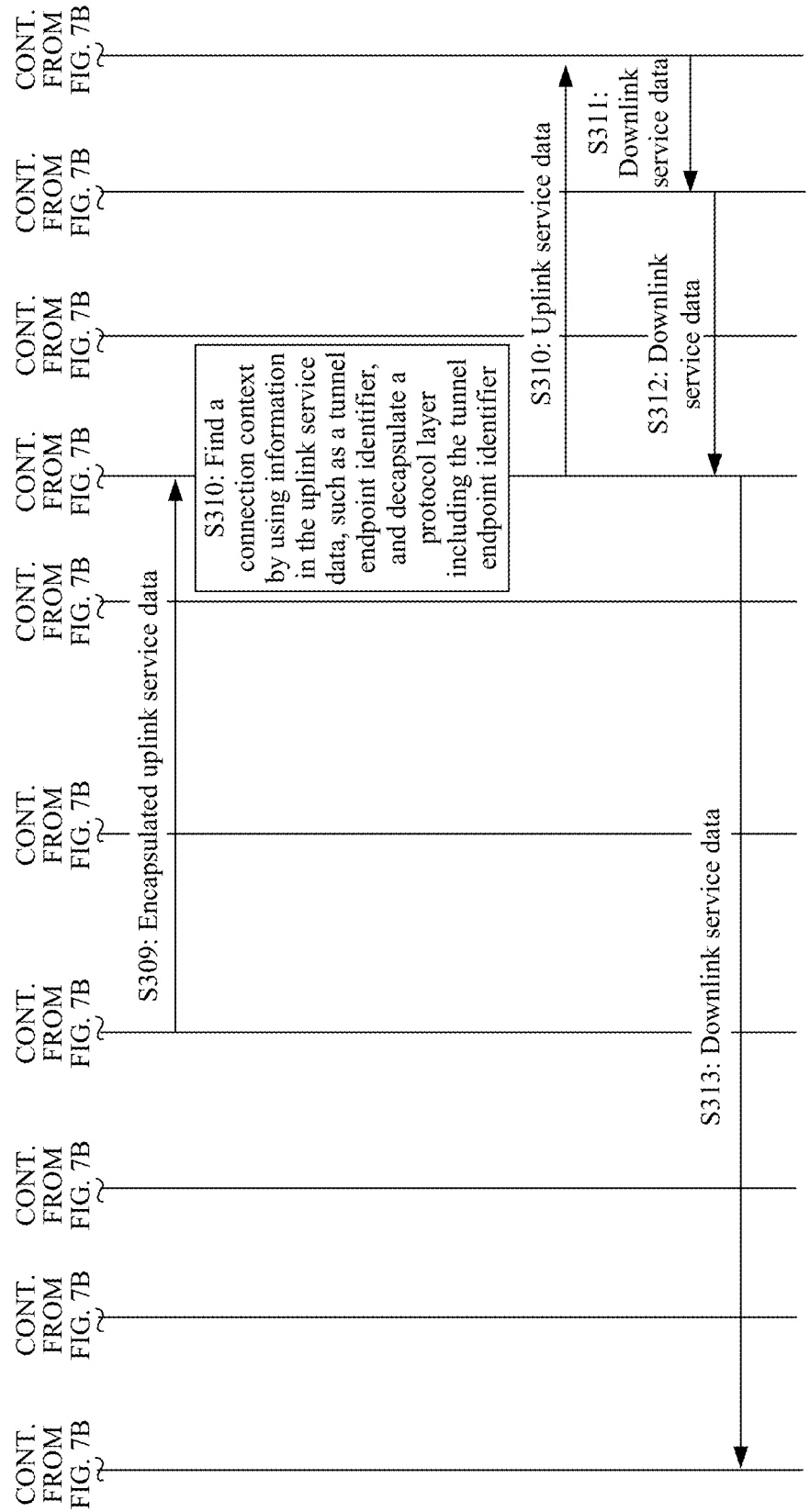

However, in actual application, the user plane network element 1 may be abnormal (for example, faulty or overloaded), causing the user plane network element 1 unable to normally forward the service data of the UE. In this case, to avoid service data transmission interruption, in this embodiment of the present application, the resource management node may reallocate the user equipment IP address segment and the tunnel endpoint identifier index that are originally allocated to the user plane network element 1, that is, divide the user equipment IP address segment of the user plane network element 1 as an address pool, and reallocate all or some of the user equipment IP address segment and the tunnel endpoint identifier index that are originally allocated to the user plane network element 1 to another normal user plane network element. Specifically, an implementation process is shown in FIG. 7A, FIG. 7B, and FIG. 7C.

S301: A resource management node detects that a user plane network element 1 becomes faulty.

Optionally, that the user plane network element 1 becomes faulty may be: the user plane network element 1 breaks down, or the user plane network element 1 is overloaded. A specific detection method is not limited in this embodiment of the present application. That the user plane network element 1 becomes faulty may be learned by another node such as a control plane network element. Alternatively, that the user plane network element 1 becomes faulty may be learned through detection and monitoring between the resource management node and the user plane network element 1.

That the user plane network element 1 is overloaded may mean that load (for example, a quantity of accessed service data packets) on the user plane network element 1 is greater than or equal to a preset threshold, or load on a central processing unit (CPU) of the user plane network element 1 is greater than or equal to a preset threshold, or memory consumption of the user plane network element 1 is greater than or equal to a preset threshold, where the preset threshold may be set according to a requirement. This is not limited in this embodiment of the present application.

S302: The resource management node uses an IP address segment that is originally allocated to the user plane network element 1 as an IP address pool, divides the IP address pool into at least one IP address segment, and determines at least one tunnel endpoint identifier index based on the at least one IP address segment.

The resource management node may use a step same as step S102 to divide the IP address segment that is originally allocated to the user plane network element 1 into the at least one IP address segment, and determine the at least one tunnel endpoint identifier index based on the at least one IP address segment.

It can be understood that the resource management node may alternatively not divide the IP address segment, but directly obtain and use the IP address segment that has been allocated to the user plane network element 1 and a tunnel endpoint identifier index corresponding to the IP address segment as the at least one IP address segment and the at least one tunnel endpoint identifier index.

S303: The resource management node allocates the at least one IP address segment and the at least one tunnel endpoint identifier index in step S302 to another user plane network element different from the user plane network element 1 in FIG. 3.

For example, the at least one IP address segment and the at least one tunnel endpoint identifier index may be reallocated to a user plane network element 2, a user plane network element 3, and a user plane network element 4.

The allocation process in step S303 is similar to the process in step S103, and details are not described herein again. The other user plane network element different from the user plane network element 1 may be one or more user plane network elements.

It should be noted that in a scenario in which the user plane network element 1 is totally faulty (that is, breaks down), the resource management node may reallocate all IP address segments and tunnel endpoint identifier indexes of the user plane network element 1 to another normal user plane network element. In a scenario in which the user plane network element 1 is overloaded, the resource management node may reallocate some IP address segments and tunnel endpoint identifier indexes of the user plane network element 1 to another normal user plane network element, to alleviate an overloaded status of the user plane network element 1.

S304: The resource management node notifies the other user plane network element of a user equipment IP address segment and a tunnel endpoint identifier index that are allocated to the other user plane network element.

The notification process in step S304 is similar to the process in step S203, and details are not described herein again.

S305: The resource management node notifies a forwarding node 3 of a correspondence between the user plane network element and the IP address segment, and notifies a forwarding node 1 of a correspondence between the user plane network element and the tunnel endpoint identifier index.

Optionally, the resource management node may directly notify the forwarding node 3 of the correspondence between the user plane network element and the IP address segment, and notify the forwarding node 1 of the correspondence between the user plane network element and the tunnel endpoint identifier index.

Alternatively, the resource management node may notify a transmission control node of a correspondence among the user plane network element, the user equipment IP address segment, and the tunnel endpoint identifier index. The correspondence is a correspondence among an identifier of each user plane network element, a user equipment IP address segment allocated to the user plane network element, and a tunnel endpoint identifier index allocated to the user plane network element. The identifier of the user plane network element may be information that can uniquely identify the user plane network element, such as an IP address of the user plane network element, or an ID of the user plane network element.

After receiving the correspondence among the user plane network element, the user equipment IP address segment, and the tunnel endpoint identifier index that is sent by the resource management node, the transmission control node notifies the forwarding node 3 of the correspondence between the user plane network element and the IP address segment, and notifies the forwarding node 1 of the correspondence between the user plane network element and the tunnel endpoint identifier index.

The notification process in step S305 is similar to the process in step S204, and details are not described herein again.

S306: The resource management node notifies a control plane network element of a correspondence among the IP address segment, the tunnel endpoint identifier index, and the user plane network element.

It should be noted that an order of step S305 and step S306 may change and may be different from that in the figure.

S307: UE sends uplink service data to an access network.

S308: After receiving the uplink service data, the access network encapsulates a tunnel endpoint identifier of the user plane network element 1 into the uplink service data, and sends the encapsulated uplink service data to the forwarding node 1.

S309: If the tunnel endpoint identifier originally allocated to the user plane network element 1 is reallocated to a user plane network element 2, after receiving the uplink service data, the forwarding node 1 sends the uplink service data to the user plane network element 2 based on the tunnel endpoint identifier in the uplink service data, and the correspondence between the user plane network element and the tunnel endpoint identifier index that is obtained in step 305.

S310: After receiving the uplink service data, the user plane network element 2 finds a connection context by using information in the uplink service data, such as the tunnel endpoint identifier, decapsulates a protocol layer including the tunnel endpoint identifier, and forwards the uplink service data to a packet data network.

Correspondingly, in an inverse process of sending the uplink service data, the UE may also receive downlink service data sent by the packet data network. Details are shown in FIG. 7A and FIG. 7B.

S311: The packet data network sends downlink service data to the forwarding node 3, where the downlink service data includes an IP address of the UE.

S312: If the IP address segment that includes the IP address of the UE and that is originally allocated to the user plane network element 1 is reallocated to the user plane network element 2, after receiving the downlink service data, the forwarding node 3 sends the downlink service data to the user plane network element 2 based on the IP address of the UE in the downlink service data, and the correspondence between the user plane network element and the IP address segment that is obtained in step 305.

S313: After receiving the downlink service data, the user plane network element 2 finds a connection context by using information in the downlink service data, such as the IP address of the UE, and forwards the downlink service data to the UE based on information in the connection context.

The connection contexts in step S310 and step S313 may be obtained in the following two manners:

1. After receiving the correspondence among the IP address segment, the tunnel endpoint identifier index, and the user plane network element, the control plane network element sends an affected connection context to a new user plane network element. The affected connection context is a connection context that is originally established at the user plane network element 1. Because a user equipment IP address and a tunnel endpoint identifier that are related to the context are reallocated to the user plane network element 2, the connection context is also sent to the user plane network element 2.

2. After receiving the uplink service data, the user plane network element 2 cannot find a corresponding connection context based on the tunnel endpoint identifier, and the user plane network element 2 obtains the connection context from the control plane network element. Optionally, the user plane network element 2 adds the tunnel endpoint identifier to a message and sends the message to the control plane network element. The control plane network element searches for the corresponding connection context based on the tunnel endpoint identifier, and sends the connection context to the user plane network element 2.

3. After receiving the downlink service data, the user plane network element 2 cannot find a corresponding connection context based on information such as the IP address of the UE, and the user plane network element 2 obtains the connection context from the control plane network element. Optionally, the user plane network element 2 adds the IP address of the UE to a message and sends the message to the control plane network element. The control plane network element searches for the corresponding connection context based on the IP address of the UE, and sends the connection context to the user plane network element 2.

In this way, the resource management node reallocates the user equipment IP address segment and the tunnel endpoint identifier index that are allocated to the faulty or overloaded user plane network element to another user plane network element that is in normal communication, and notifies, by using the transmission control node, the forwarding node of a correspondence obtained after the reallocation, and the forwarding node forwards the service data packet of the UE based on the correspondence by using a new user plane network element, so that when a user plane network element is faulty/overloaded or the like, a user plane network element forwarding the service data packet of the user equipment is changed without interrupting a service of the user equipment.

However, in actual application, with network development, new user plane network elements are added to the network. For example, originally there are only user plane nodes 1, 2, and 3 in the network, and later, a user plane node 4 is added. In this case, the resource management node may reallocate user equipment IP address segments and tunnel endpoint identifier indexes that are originally allocated to the user plane nodes 1, 2, and 3, and allocate some to the user plane node 4. In a process of reallocating the IP address segments and tunnel endpoint identifier indexes of the original user plane network nodes to the newly added user plane network nodes, to minimize impact on the original user plane nodes, the resource management node may use a plurality of principles to reallocate the user equipment IP address segments and the tunnel endpoint identifier indexes. For example, a node with excessively high load is selected from the user plane nodes 1, 2, and 3, and some of the user equipment IP address segments and tunnel endpoint identifier indexes originally allocated to this user plane node are allocated to the newly added user plane node 4. For another example, a node with smallest capacity is selected from the user plane nodes 1, 2, and 3, and some of the user equipment IP address segments and tunnel endpoint identifier indexes originally allocated to this user plane node are allocated to the newly added user plane node 4.

Figure 8A:
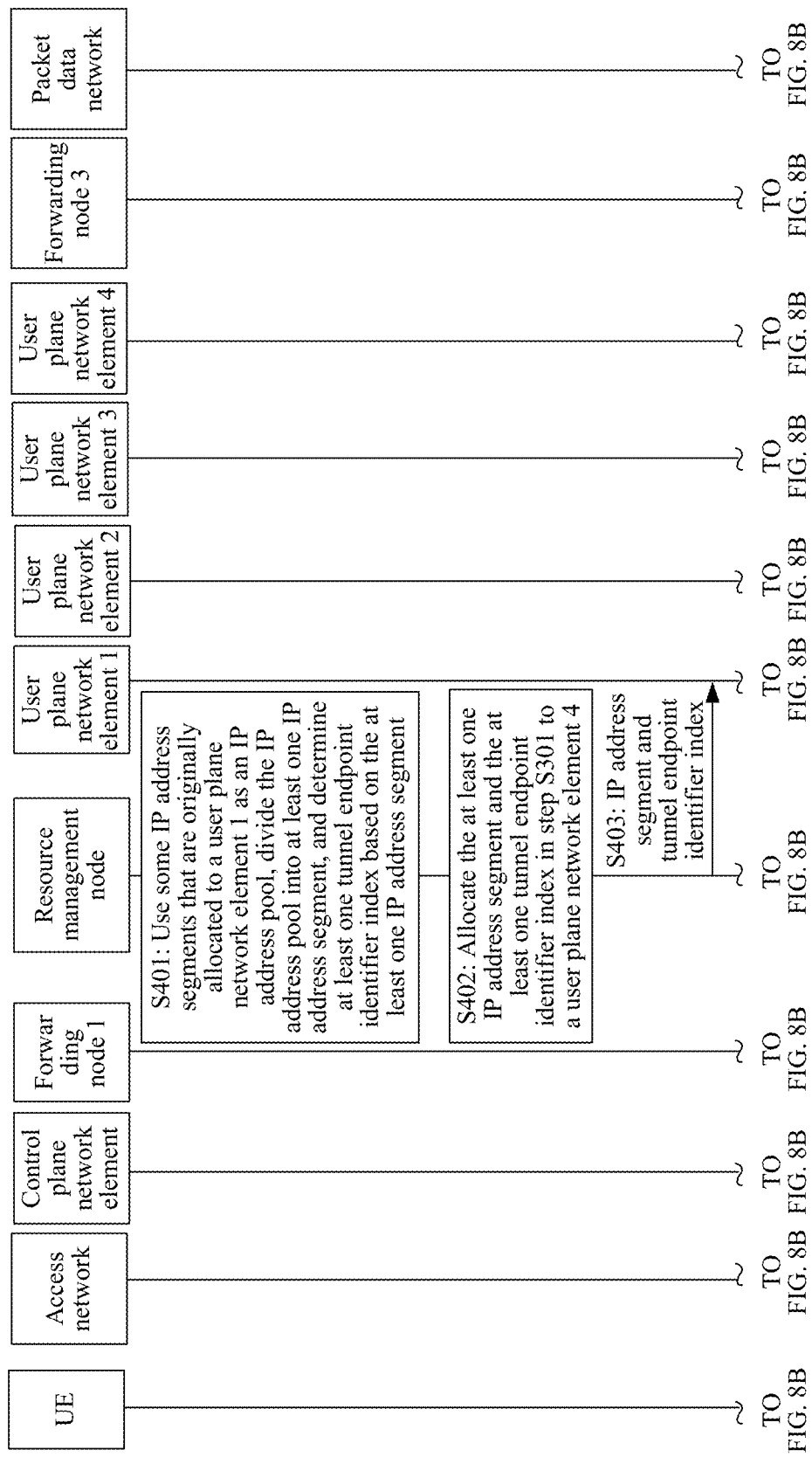
Figure 8B:
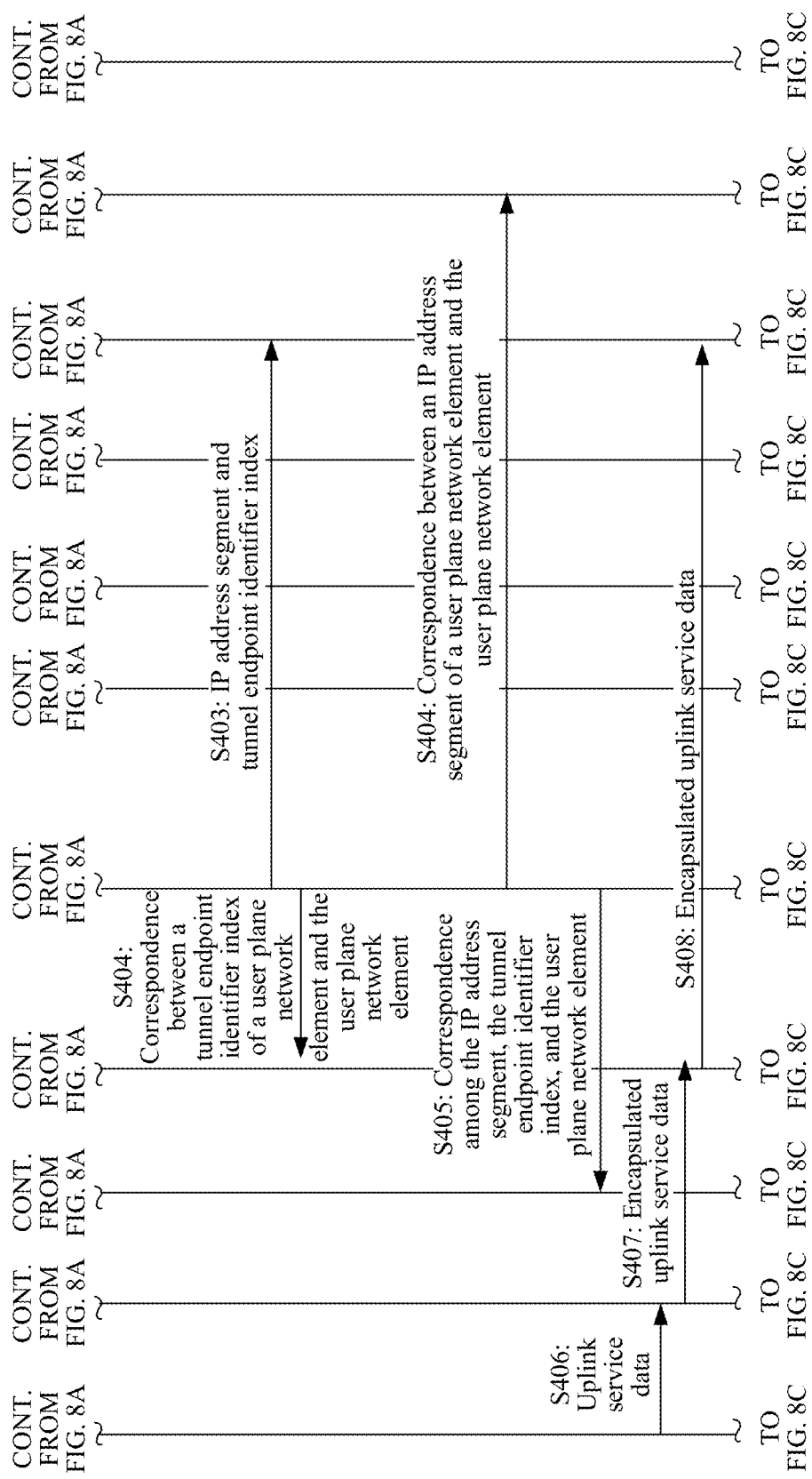

The following describes the technical solution provided in an embodiment of the present application with reference to FIG. 8A, FIG. 8B, and FIG. 8C by using an example in which some of IP address segments and tunnel endpoint identifier indexes originally allocated to a user plane network element 1 to a newly added user plane network element 4. As shown in FIG. 8A, FIG. 8B, and FIG. 8C, the method may include the following steps.

S401: A resource management node uses some IP address segments that are originally allocated to a user plane network element 1 as an IP address pool, divides the IP address pool into at least one IP address segment, and determines at least one tunnel endpoint identifier index based on the at least one IP address segment.

In step S401, a process same as step S102 may be used to divide some IP address segments that are originally allocated to the user plane network element 1 into at least one IP address segment, and determine at least one tunnel endpoint identifier index based on the at least one IP address segment obtained through division.

Optionally, the resource management node may alternatively not divide the IP address segments, but directly obtains and uses some IP address segments that have been allocated to the user plane network element 1 and tunnel endpoint identifier indexes corresponding to the some IP address segments as the at least one IP address segment and the at least one tunnel endpoint identifier index.

For example, the user plane network element 1 has five IP address segments and tunnel endpoint identifier indexes corresponding to the five IP address segments. The resource management node directly obtains three out of the five IP address segments and tunnel endpoint identifier indexes corresponding to the three IP address segments.

S402: The resource management node allocates the at least one IP address segment and the at least one tunnel endpoint identifier index in step S401 to a user plane network element 4.

The allocation process in step S402 is similar to the process in step S103, and details are not described herein again.

S403: The resource management node notifies the user plane network element 1 and the user plane network element 4 of their respective allocated user equipment IP address segments and tunnel endpoint identifier indexes.

The notification process in step S403 is similar to the process in step S203, and details are not described herein again.

S404: The resource management node notifies a forwarding node 3 of a correspondence between the user plane network element and the IP address segment, and notifies a forwarding node 1 of a correspondence between the user plane network element and the tunnel endpoint identifier index.

The resource management node may notify, by using a transmission control node, the forwarding node 3 of the correspondence between the user plane network element and the IP address segment, and the forwarding node 1 of the correspondence between the user plane network element and the tunnel endpoint identifier index.

The notification process in step S404 is similar to the process in step S304, and details are not described herein again.

S405: The resource management node notifies a control plane network element of a correspondence among the IP address segment, the tunnel endpoint identifier index, and the user plane network element.

It should be noted that an order of step S404 and step S405 may change and may be different from that in the figure.

S406: UE sends uplink service data to an access network.

S407: After receiving the uplink service data, the access network encapsulates a tunnel endpoint identifier of the user plane network element 1 into the uplink service data, and sends the encapsulated uplink service data to the forwarding node 1.

S408: If the tunnel endpoint identifier originally allocated to the user plane network element 1 is allocated to the user plane network element 4, after receiving the uplink service data, the forwarding node 1 sends the uplink service data to the user plane network element 4 based on the tunnel endpoint identifier in the uplink service data, and the correspondence between the user plane network element and the tunnel endpoint identifier index that is obtained in step 404.

S409: After receiving an uplink service data packet, the user plane network element 4 finds a connection context by using information in the uplink service data, such as the tunnel endpoint identifier, decapsulates a protocol layer including the tunnel endpoint identifier, and forwards the uplink service data to a packet data network.

Correspondingly, in an inverse process of sending the uplink service data, the UE may also receive downlink service data sent by the packet data network. Details are shown in FIG. 8A, FIG. 8B, and FIG. 8C.

S410: The packet data network sends downlink service data to the forwarding node 3, where the downlink service data includes an IP address of the UE.

S411: If the IP address segment that includes the IP address of the UE and that is originally allocated to the user plane network element 1 is allocated to the user plane network element 4, after receiving the downlink service data, the forwarding node 3 sends the downlink service data to the user plane network element 4 based on the IP address of the UE in the downlink service data, and the correspondence between the user plane network element and the IP address segment that is obtained in step 404.

S412: After receiving a downlink service data packet, the user plane network element 4 finds a connection context by using information in the downlink service data, such as the IP address of the UE, and forwards the downlink service data to the UE based on information in the connection context.

The connection contexts in step S409 and step S412 may be obtained in the following two manners:

1. After receiving the correspondence among the IP address segment, the tunnel endpoint identifier index, and the user plane network element, the control plane network element sends an affected connection context to a new user plane network element. The affected connection context is a connection context that is originally established at the user plane network element 1. After a user equipment IP address and a tunnel endpoint identifier that are related to the context are reallocated to the user plane network element 4, the connection context is also sent to the user plane network element 4.

2. After receiving the uplink service data, the user plane network element 4 cannot find a corresponding connection context based on the tunnel endpoint identifier, and the user plane network element 4 obtains the connection context from the control plane network element. Optionally, the user plane network element 4 adds the tunnel endpoint identifier to a message and sends the message to the control plane network element. The control plane network element searches for the corresponding connection context based on the tunnel endpoint identifier, and sends the connection context to the user plane network element 4.

3. After receiving the downlink service data, the user plane network element 4 cannot find a corresponding connection context based on information such as the IP address of the UE, and the user plane network element 4 obtains the connection context from the control plane network element. Optionally, the user plane network element 4 adds the IP address of the UE to a message and sends the message to the control plane network element. The control plane network element searches for the corresponding connection context based on the IP address of the UE, and sends the connection context to the user plane network element 4.

In this way, when a new user plane network element is added, an IP address and a tunnel endpoint identifier of an original user plane network element may be allocated to the newly added user plane network element without interrupting a service of the user equipment. In addition, a correspondence obtained after allocation is notified to the forwarding node by using the transmission control node, and the forwarding node forwards the service data packet of the UE based on the correspondence by using the newly added user plane network element, to implement load sharing among the user plane network elements. In addition, according to the method of the present application, no configuration needs to be performed when a new user plane network element is added to the network, allowing the newly added user plane network element to be plug-and-play.

The foregoing mainly describes the service transmission method provided in the embodiments of the present application from a perspective of interaction between the resource management node, the transmission control node, the user plane network element, the control plane network element, the forwarding node, the access network, the UE, and the packet data network. It may be understood that to implement the foregoing functions, the foregoing nodes or network elements include corresponding hardware structures and/or software modules for executing the functions. Persons of ordinary skill in the art should easily be aware that units and algorithm steps in examples described with reference to the embodiments disclosed in this specification can be implemented by hardware or a combination of hardware and computer software in the present application. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of the present application.

In the embodiments of the present application, functional modules may be defined for the resource management node, the transmission control node, the first forwarding node, and the second forwarding node according to the foregoing method examples with reference to FIG. 9 to FIG. 12, for example, functional modules may be divided in correspondence to functions, or two or more functions may be integrated into one processing module. The integrated module may be implemented in a form of hardware, or may be implemented in a form of a software functional module. It should be noted that the module division in the embodiments of the present application is an example, is merely logical function division, and may be other division during actual implementation.

Figure 9:
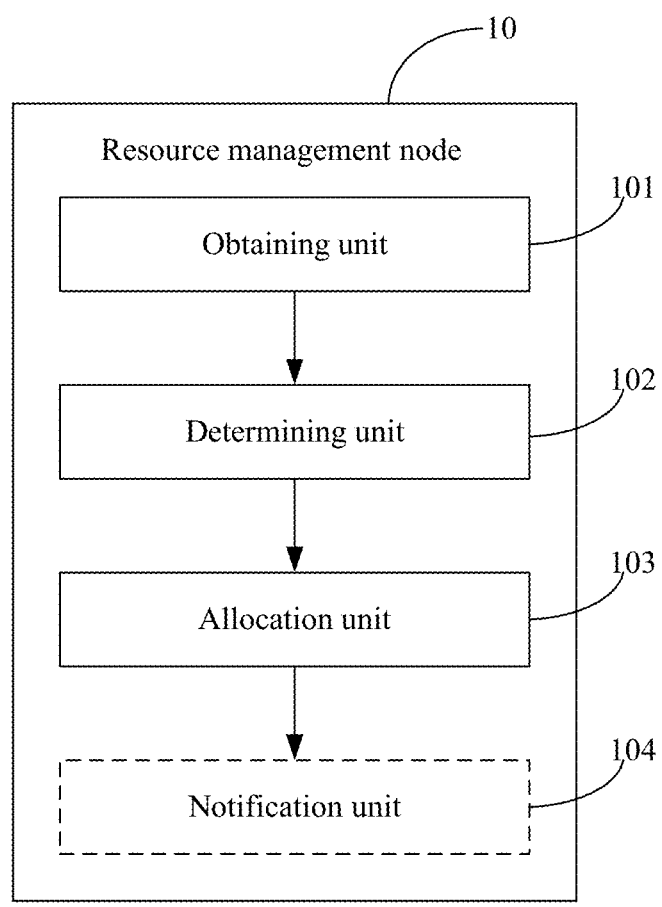
FIG. 9 is a structural diagram of a resource management node 10 according to an embodiment of the present application.

When functional modules are divided in correspondence to functions, FIG. 9 is a possible schematic structural diagram of a resource management node according to an embodiment of the present application. As shown in FIG. 9, the resource management node 10 may be configured to implement the method performed by the resource management node in the method embodiments. The resource management node 10 may include: an obtaining unit 101, a determining unit 102, and an allocation unit 103. For example, the obtaining unit 101 is configured to support the resource management node in performing the process S101 in FIG. 5A, the determining unit 102 is configured to support the resource management node in performing the process S102 in FIG. 5A, and the allocation unit 103 is configured to support the resource management node in performing the processes S104 and S105 in FIG. 5A and FIG. 5B. Further optionally, as shown in FIG. 9, the resource management node 10 may further include a notification unit 104, to perform some corresponding processes in the method embodiments.

All related content of various steps in the method embodiments may be cited as function descriptions of corresponding functional modules, and details are not described herein again.

When an integrated unit is used, the obtaining unit 101, the determining unit 102, and the allocation unit 103 shown in FIG. 9 may be integrated as one processing module. The processing module performs control management on actions of the resource management node 10. For example, the processing module is configured to support the resource management node in performing the processes S101 to S105 in FIG. 5A and FIG. 5B, and/or another process of the technology described in this specification. The notification unit 104 may be integrated into a communications module, configured to support the resource management node 10 in communicating with another network entity. The resource management node 10 may further include a storage module, configured to store program code and data of the resource management node 10. The processing module may be the processor 1011 in the physical structure of the resource management node 10 shown in FIG. 4, or may be a processor or a controller, for example, a CPU, a general-purpose processor, a DSP, an ASIC, an FPGA or another programmable logic device, a transistor logic device, a hardware component, or any combination thereof. The processing module may implement or execute various example logical blocks, modules, and circuits described with reference to content disclosed in the present application. Alternatively, the processor may be a combination implementing a computing function, for example, a combination of one or more microprocessors, or a combination of the DSP and a microprocessor. The communications module may be the transceiver 1013 in the physical structure of the resource management node 10 shown in FIG. 4, or may be a transceiver circuit, a communications interface, or the like. The storage module may be the memory in the physical structure of the resource management node 10 shown in FIG. 4.

Figure 10:
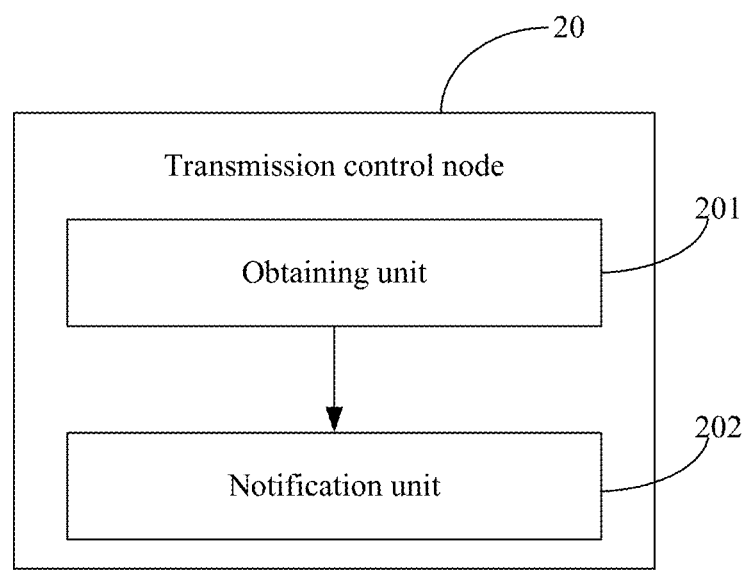
FIG. 10 is a structural diagram of a transmission control node 20 according to an embodiment of the present application.

When functional modules are divided in correspondence to functions, FIG. 10 is a possible schematic structural diagram of a transmission control node according to an embodiment of the present application. As shown in FIG. 10, the transmission control node 20 may be configured to implement the method performed by the transmission control node in the method embodiments. The transmission control node 20 may include an obtaining unit 201 and a notification unit 202. The obtaining unit 201 is configured to support the transmission control node 20 in obtaining a correspondence among an IP address segment, a tunnel endpoint identifier index, and a user plane network element that is notified by the resource management node 10. The notification unit 202 is configured to support the transmission control node 20 in notifying a first forwarding node of a correspondence between the IP address and the user plane network element, and is configured to support the transmission control node 20 in notifying a second forwarding node of a correspondence between the tunnel endpoint identifier index and the user plane network element.

All related content of various steps in the method embodiments may be cited as function descriptions of corresponding functional modules, and details are not described herein again.

When an integrated unit is used, the obtaining unit 201 and the notification unit 202 shown in FIG. 10 may be integrated in a communications module, configured to support the transmission control node 20 in communicating with another network entity. The transmission control node 20 may further include a processing module and a storage module. The processing module is configured to implement a control function of the transmission control node 20, and the storage module is configured to store program code and data of the transmission control node 20. The processing module may be a processor in a physical structure of the transmission control node 20, or may be a processor or a controller, for example, a CPU, a general-purpose processor, a DSP, an ASIC, an FPGA or another programmable logic device, a transistor logic device, a hardware component, or any combination thereof. The processing module may implement or execute various example logical blocks, modules, and circuits described with reference to content disclosed in the present application. Alternatively, the processor may be a combination implementing a computing function, for example, a combination of one or more microprocessors, or a combination of the DSP and a microprocessor. The communications module may be a transceiver in the physical structure of the transmission control node, or may be a transceiver circuit, a communications interface, or the like. The storage module may be a memory in the physical structure of the transmission control node.

Figure 11:
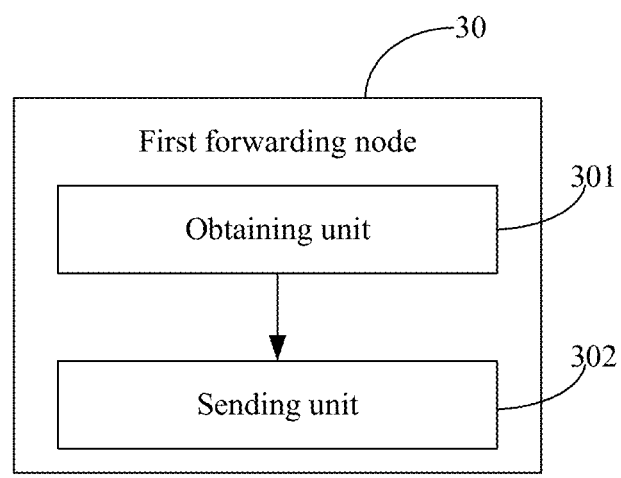
FIG. 11 is a structural diagram of a first forwarding node 30 according to an embodiment of the present application.

When functional modules are divided in correspondence to functions, FIG. 11 is a possible schematic structural diagram of a first forwarding node according to an embodiment of the present application. As shown in FIG. 11, the first forwarding node 30 may be configured to implement the method performed by the first forwarding node in the method embodiments. The first forwarding node 30 may include an obtaining unit 301 and a sending unit 302. The obtaining unit 301 is configured to support the first forwarding node 30 in performing step S105 shown in FIG. 5B, and the sending unit 302 is configured to support the first forwarding node 30 in performing step S107 shown in FIG. 5B.

All related content of various steps in the method embodiments may be cited as function descriptions of corresponding functional modules, and details are not described herein again.

When an integrated unit is used, the obtaining unit 301 and the sending unit 302 shown in FIG. 11 may be integrated in a communications module, configured to support the first forwarding node 30 in communicating with another network entity. The first forwarding node 30 may further include a processing module and a storage module. The processing module is configured to implement a control function of the first forwarding node 30, and the storage module is configured to store program code and data of the first forwarding node 30. The processing module may be a processor in a physical structure of the first forwarding node 30, or may be a processor or a controller, for example, a CPU, a general-purpose processor, a DSP, an ASIC, an FPGA or another programmable logic device, a transistor logic device, a hardware component, or any combination thereof. The processing module may implement or execute various example logical blocks, modules, and circuits described with reference to content disclosed in the present application. Alternatively, the processor may be a combination implementing a computing function, for example, a combination of one or more microprocessors, or a combination of the DSP and a microprocessor. The communications module may be a transceiver in the physical structure of the first forwarding node, or may be a transceiver circuit, a communications interface, or the like. The storage module may be a memory in the physical structure of the first forwarding node.

Figure 12:
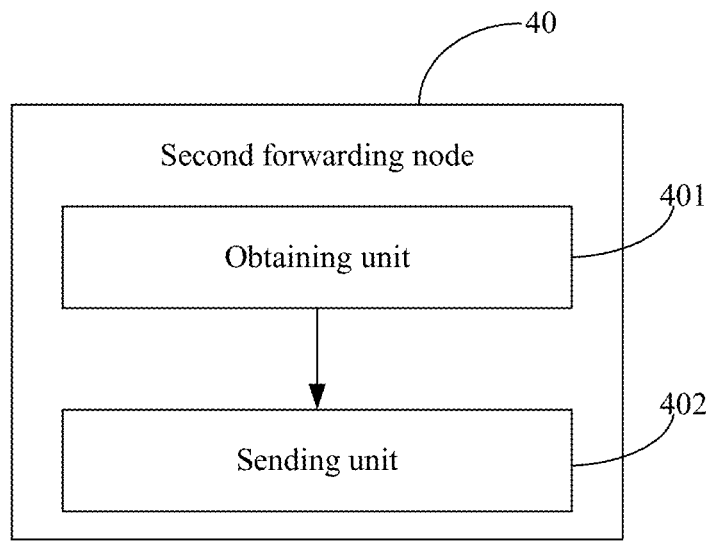
FIG. 12 is a structural diagram of a second forwarding node 40 according to an embodiment of the present application.

When functional modules are divided in correspondence to functions, FIG. 12 is a possible schematic structural diagram of a second forwarding node according to an embodiment of the present application. As shown in FIG. 12, the second forwarding node 40 may be configured to implement the method performed by the second forwarding node in the method embodiments. The second forwarding node 40 may include an obtaining unit 401 and a sending unit 402. The obtaining unit 401 is configured to support the second forwarding node 40 in performing step S104 shown in FIG. 5A, and the sending unit 402 is configured to support the second forwarding node 40 in performing step S106 shown in FIG. 5B.

All related content of various steps in the method embodiments may be cited as function descriptions of corresponding functional modules, and details are not described herein again.

When an integrated unit is used, the obtaining unit 401 and the sending unit 402 shown in FIG. 12 may be integrated in a communications module, configured to support the second forwarding node 40 in communicating with another network entity. The second forwarding node 40 may further include a processing module and a storage module. The processing module is configured to implement a control function of the second forwarding node 40, and is configured to store program code and data of the second forwarding node 40. The processing module may be a processor in a physical structure of the second forwarding node 40, or may be a processor or a controller, for example, a CPU, a general-purpose processor, a DSP, an ASIC, an FPGA or another programmable logic device, a transistor logic device, a hardware component, or any combination thereof. The processing module may implement or execute various example logical blocks, modules, and circuits described with reference to content disclosed in the present application. Alternatively, the processor may be a combination implementing a computing function, for example, a combination of one or more microprocessors, or a combination of the DSP and a microprocessor. The communications module may be a transceiver in the physical structure of the second forwarding node, or may be a transceiver circuit, a communications interface, or the like. The storage module may be a memory in the physical structure of the second forwarding node.

Figure 13:
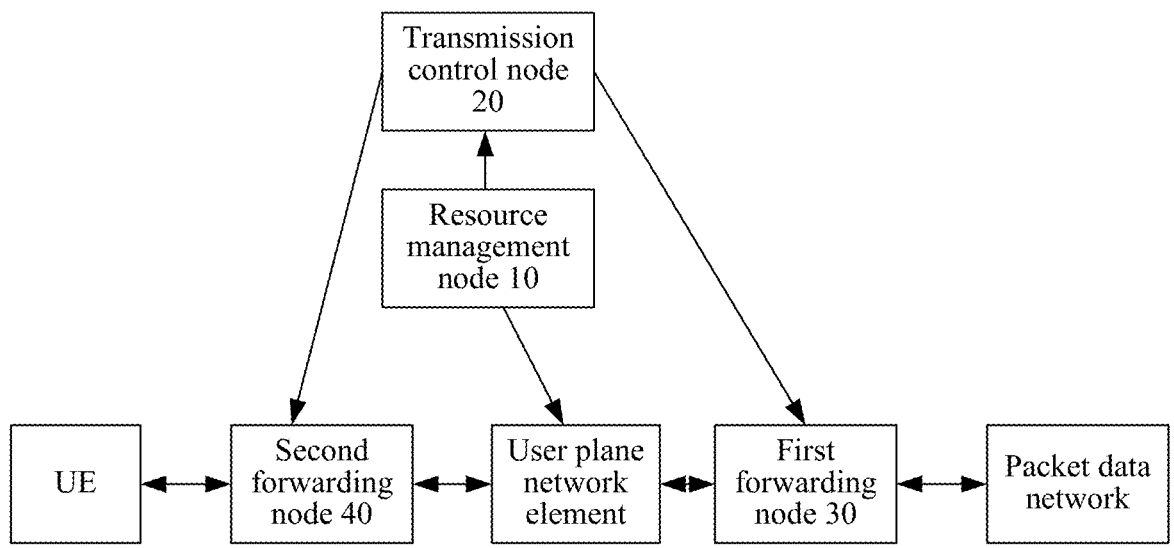
FIG. 13 is a structural diagram of a service transmission system according to an embodiment of the present application.

An embodiment of the present application further provides a service transmission system. As shown in FIG. 13, the service transmission system may include a device such as the resource management node 10, the transmission control node 20, the first forwarding node 30, the second forwarding node 40, the UE, the user plane network element, and the packet data network in any of the foregoing embodiments.

The service transmission system provided in this embodiment of the present application implements the service transmission methods shown in FIG. 5A and FIG. 5B to FIG. 8A, FIG. 8B, and FIG. 8C, and therefore can achieve beneficial effects the same as those in the foregoing service transmission methods. Details are not described herein again.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of the embodiments.

In addition, functional units in the embodiments of the present application may be integrated into one processing unit, or each of the functional units may exist independently, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer readable storage medium. The software functional unit is stored in a storage medium and includes several instructions for instructing a computer device (which may be a personal computer, a server, a network device, or the like) to perform some of the steps of the methods described in the embodiments of the present application. The foregoing storage medium includes any medium that can store program code, such as a Universal Serial Bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the claims of the present application.

What is claimed is:

1. A service transmission method, comprising:
   obtaining, by a resource management node, an internet protocol (IP) address pool;
   dividing, by the resource management node, the IP address pool into at least one IP address segment, and determining at least one tunnel endpoint identifier index based on the at least one IP address segment;
   allocating, by the resource management node, the at least one IP address segment and the at least one tunnel endpoint identifier index to at least one user plane network element,
   notifying, by the resource management node, a first forwarding node of a correspondence between the at least one IP address segment and the at least one user plane network element, wherein the first forwarding node is located between the at least one user plane network element and a packet data network; and
   notifying, by the resource management node, a second forwarding node of a correspondence between the at least one tunnel endpoint identifier index and the at least one user plane network element, wherein the second forwarding node is located between an access network and the at least one user plane network element,
   wherein uplink and downlink service data between the access network and the packet data network are forwarded through the first forwarding node and the second forwarding node.

2. The method according to claim 1, further comprising:
   notifying, by the resource management node, a transmission control node of a correspondence among the at least one IP address segment, the at least one tunnel endpoint identifier index, and the at least one user plane network element for instructing the transmission control node to notify the first forwarding node of a correspondence between the at least one IP address segment and the at least one user plane network element, and notify the second forwarding node of a correspondence between the at least one tunnel endpoint identifier index and the at least one user plane network element.

3. The method according to claim 2, wherein the correspondence among the at least one IP address segment, the at least one tunnel endpoint identifier index, and the at least one user plane network element comprises:
   a correspondence among the at least one IP address segment, the at least one tunnel endpoint identifier index, and an identifier of the at least one user plane network element, wherein the identifier of the at least one user plane network element comprises: an IP address or an identity (ID) of the at least one user plane network element.

4. The method according to claim 1, wherein allocating, by the resource management node, the at least one IP address segment and the at least one tunnel endpoint identifier index to at least one user plane network element comprises:
   allocating, by the resource management node, the at least one IP address segment and the at least one tunnel endpoint identifier index to the at least one user plane network element based on user plane network element information, wherein the user plane network element information comprises:
   a quantity of available user plane network elements and/or a capacity of a user plane network element in a network in which the resource management node is located.

5. The method according to claim 1, wherein allocating, by the resource management node, the at least one IP address segment and the at least one tunnel endpoint identifier index to at least one user plane network element comprises:
   allocating, by the resource management node, the at least one IP address segment and the at least one tunnel endpoint identifier index to a newly added user plane network element.

6. The method according to claim 1, wherein obtaining, by the resource management node, the IP address pool comprises:
   obtaining, by the resource management node, the IP address pool from an operation and maintenance (O&M) network element.

7. The method according to claim 1, wherein obtaining, by the resource management node, the IP address pool comprises:
   obtaining, by the resource management node, some or all of the at least one IP address segment allocated to the at least one user plane network element, and using the obtained some or all of the at least one IP address segment as the IP address pool.

8. The method according to claim 7, wherein allocating, by the resource management node, the at least one IP address segment and the at least one tunnel endpoint identifier index to at least one user plane network element comprises:

allocating, by the resource management node, the at least one IP address segment and the at least one tunnel endpoint identifier index to at least one first user plane network element different from the at least one user plane network element.

9. The method according to claim 1, wherein the IP address segment and the tunnel endpoint identifier index that is determined based on the IP address segment are allocated to a same user plane network element.

10. A service transmission method, the method comprising:

obtaining, by a transmission control node, a correspondence among an internet protocol (IP) address segment, a tunnel endpoint identifier index, and a user plane network element that is sent by a resource management node;

notifying, by the transmission control node, a first forwarding node of a correspondence between the IP address segment and the user plane network element, wherein the first forwarding node is located between the user plane network element and a packet data network; and notifying, by the transmission control node, a second forwarding node of a correspondence between the tunnel endpoint identifier index and the user plane network element, wherein the second forwarding node is located between an access network and the user plane network element, wherein uplink and downlink service data between the access network and the packet data network are forwarded through the first forwarding node and the second forwarding node.

11. The method according to claim 10, wherein the correspondence among the IP address segment, the tunnel endpoint identifier index, and the user plane network element comprises:

a correspondence among the IP address segment, the tunnel endpoint identifier index, and an identifier of the user plane network element, wherein the identifier of the user plane network element comprises an IP address or an identity (ID) of the user plane network element.

12. A resource management node, comprising:
one or more processors; and
memory coupled to the one or more processors and comprising instructions which, when executed by the one or more processors, cause the resource management node to:
obtain an IP address pool,
divide the IP address pool into at least one IP address segment, and determine at least one tunnel endpoint identifier index based on the at least one IP address segment, and
allocate, to at least one user plane network element, the at least one IP address segment and the at least one tunnel endpoint identifier index, notify a first forwarding node of a correspondence between the at least one IP address segment and the at least one user plane network element, wherein the first forwarding node is located between the at least one user plane network element and a packet data network; and notify a second forwarding node of a correspondence between the at least one tunnel endpoint identifier index and the at least one user plane network element, wherein the second forwarding node is located between an access network and the at least one user plane network element, wherein uplink and downlink service data between the access network and the packet data network are forwarded through the first forwarding node and the second forwarding node.

13. The resource management node according to claim 12, wherein the instructions, when executed by the one or more processors, cause the resource management node to:

notify a transmission control node of a correspondence among the at least one IP address segment, the at least one tunnel endpoint identifier index, and the at least one user plane network element for instructing the transmission control node to notify the first forwarding node of a correspondence between the at least one IP address segment and the at least one user plane network element, and notify the second forwarding node of a correspondence between the at least one tunnel endpoint identifier index and the at least one user plane network element.

14. The resource management node according to claim 13, wherein the correspondence among the least one IP address segment, the at least one tunnel endpoint identifier index, and the at least one user plane network element comprises:

a correspondence among the at least one IP address segment, the at least one tunnel endpoint identifier index, and an identifier of the at least one user plane network element, wherein the identifier of the at least one user plane network element comprises: an IP address or an identity (ID) of the at least one user plane network element.

15. The resource management node according to claim 12, wherein the instructions, when executed by the one or more processors, cause the resource management node to:

allocate the at least one IP address segment and the at least one tunnel endpoint identifier index to the at least one user plane network element based on user plane network element information, wherein the user plane network element information comprises:

a quantity of available user plane network elements and/or a capacity of a user plane network element in a network in which the resource management node is located.

16. The resource management node according to claim 12, wherein the instructions, when executed by the one or more processors, cause the resource management node to:

allocate the at least one IP address segment and the at least one tunnel endpoint identifier index to a newly added user plane network element.

\* \* \* \* \*